United States Patent
Gaughan

(10) Patent No.: US 11,938,937 B2
(45) Date of Patent: Mar. 26, 2024

(54) VEHICLE CONTROL SYSTEM

(71) Applicant: Westinghouse Air Brake Technologies Corporation, Pittsburgh, PA (US)

(72) Inventor: Edward Gaughan, Wilmerding, PA (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 67 days.

(21) Appl. No.: 17/602,902

(22) PCT Filed: Mar. 3, 2021

(86) PCT No.: PCT/US2021/020728
§ 371 (c)(1),
(2) Date: Oct. 11, 2021

(87) PCT Pub. No.: WO2021/178576
PCT Pub. Date: Sep. 10, 2021

(65) Prior Publication Data
US 2022/0169249 A1    Jun. 2, 2022

Related U.S. Application Data

(60) Provisional application No. 63/045,634, filed on Jun. 29, 2020, provisional application No. 63/018,199, (Continued)

(51) Int. Cl.
*B60W 30/16*    (2020.01)
*B60T 17/22*    (2006.01)

(52) U.S. Cl.
CPC ............ *B60W 30/16* (2013.01); *B60T 17/22* (2013.01); *B60W 2400/00* (2013.01); (Continued)

(58) Field of Classification Search
CPC ............ B60W 30/16; B60W 2400/00; B60W 2510/182; B60W 2556/65; (Continued)

(56) References Cited

U.S. PATENT DOCUMENTS 4,317,988 A    3/1982   Wilson
6,322,161 B1   11/2001  Maslonka et al.
(Continued)

FOREIGN PATENT DOCUMENTS

KR    20190064826 A    6/2019
WO    2017035516 A1    3/2017

OTHER PUBLICATIONS

Afshari et al., "A train air brake force model: Car control unit and numerical results", 2012, Institution of Mechanical Engineers, Journal of Rail and Rapid Transit (Year: 2012) 18 pages.
(Continued)

*Primary Examiner* — Michael V Kerrigan
(74) *Attorney, Agent, or Firm* — The Small Patent Law Group LLC; Christopher R. Carroll

(57) ABSTRACT

A vehicle control system receives signals from sensors on board a first vehicle and plural other, second vehicles. Based on the signals received from the sensors, the system determines a brake assessment of a brake system, where the brake assessment includes a state of health of the brake system and/or a location of interest of a leak in the brake system. The system controls movement of the first vehicle and the second vehicles relative to at least one remote vehicle system based at least in part on the brake assessment that is determined.

20 Claims, 13 Drawing Sheets

Related U.S. Application Data filed on Apr. 30, 2020, provisional application No. 62/985,147, filed on Mar. 4, 2020.

(52) U.S. Cl.
CPC ... *B60W 2510/182* (2013.01); *B60W 2556/65* (2020.02); *B60W 2754/30* (2020.02)

(58) Field of Classification Search
CPC .... B60W 2754/30; B60T 17/22; B60T 8/885; B60T 2270/403; B60T 2270/406
See application file for complete search history.

(56) References Cited

U.S. PATENT DOCUMENTS

| | | |
|---|---|---|
| 7,769,509 B2 | 8/2010 | Gaughan et al. |
| 9,216,724 B1 | 12/2015 | Wright et al. |
| 9,963,126 B1 | 5/2018 | Wright |
| 2007/0044551 A1 | 3/2007 | Fogelstrom |
| 2008/0129480 A1 | 6/2008 | Gaughan et al. |
| 2013/0304313 A1 | 11/2013 | Svensson et al. |
| 2016/0264120 A1 | 9/2016 | Kellner et al. |
| 2016/0318491 A1 | 11/2016 | Seaton |
| 2017/0203745 A1 | 7/2017 | Kumar et al. |
| 2018/0319414 A1 | 11/2018 | Lefebvre et al. |
| 2019/0171226 A1 | 6/2019 | Kim |
| 2019/0206261 A1 | 7/2019 | Szymczak et al. |
| 2020/0079343 A1 | 3/2020 | Martin |
| 2020/0384974 A1 | 12/2020 | Call |
| 2021/0122350 A1 | 4/2021 | Farres et al. |
| 2021/0179054 A1* | 6/2021 | Wright .................. B60T 8/1705 |
| 2021/0181760 A1 | 6/2021 | Lee |
| 2021/0284179 A1 | 9/2021 | Diamond et al. |
| 2021/0318199 A1 | 10/2021 | Rosenberg et al. |

OTHER PUBLICATIONS

International Search Report and Written Opinion of Patentability for International Application No. PCT/US2021/020728, dated Jun. 9, 2021, 15 pages.

International Preliminary Report on Patentability for corresponding International Application No. PCT/US2021/020728 dated Sep. 15, 2022 (9 pages).

\* cited by examiner

VEHICLE CONTROL SYSTEM

CROSS-REFERENCE TO RELATED APPLICATIONS

This application is a national phase entry of and claims priority to International Patent Application No. PCT/US21/20728 (filed 3 Mar. 2021), which claims priority to U.S. Provisional Application No. 63/018,199 (filed 20 Apr. 2020), U.S. Provisional Application No. 62/985,147 (filed 4 Mar. 2020), and U.S. Provisional Application No. 63/045,634 (filed 29 Jun. 2020), the entire disclosures of which are incorporated herein by reference.

BACKGROUND

Technical Field

Embodiments relate to systems for controlling vehicle movement. Other embodiments relate to systems for controlling movement of a vehicle relative to other vehicles.

Discussion of Art

Some vehicle control systems control a vehicle or group of vehicles relative to other vehicles or groups of vehicles that are traveling along the same or a related (e.g., interconnected) route. For example, an automobile may be configured to automatically brake if a speed-distance threshold is violated (e.g., too fast, too close to a nearby automobile). Also, in a rail system, trains may be automatically paced or otherwise controlled to maintain minimum distances between leading and trailing trains. Such systems are typically configured to base control on speed and distance, which results in a control profile that is in many instances overly conservative but in other instances insufficient from a safety perspective. For example, if the vehicle in question is not functioning nominally due to unknown mechanical problems or otherwise, it may not perform in an expected way when automatically controlled (e.g., braked) by a control system.

It may be desirable to provide a vehicle control system that differs from existing vehicle control systems.

BRIEF DESCRIPTION

In an embodiment, a system (e.g., vehicle control system) includes a controller having at least one processor that may receive signals from plural sensors respectively on board a first vehicle and plural other, second vehicles. The controller may determine a brake assessment of a brake system based on the signals received from the plural sensors. The brake assessment includes a state of health of the brake system and/or a location of interest of a leak in the brake system. The controller may control movement of the first vehicle and the second vehicles relative to at least one remote vehicle system based at least in part on the determined brake assessment.

In an embodiment, a system (e.g., vehicle control system) includes pressure sensors that may measure pressures in different components of a brake system of a vehicle system during activation of the brake system. The system also includes a controller that may compare two or more of the pressures that are measured in the different components with each other to select a health monitoring mode. The controller also may select one or more allowable pressures based on the health monitoring mode that is selected and to determine a state of health of the brake system by comparing one or more of the pressures that is measured with the one or more allowable pressures that are selected. The controller may control movement of the vehicle system relative to at least one remote vehicle system based at least in part on the determined state of health.

In an embodiment, a system (e.g., vehicle control system) includes plural sensor assemblies that may monitor pressures in a brake system of a vehicle system at different locations in the vehicle system. Two or more of the sensor assemblies at the different locations may determine decreases in the pressures that are monitored and to determine times at which the decreases in the pressures occurred. The system also includes a controller that may determine a location of interest of a leak in the brake system by comparing the times at which the decreases in the pressures occurred. The controller may control movement of the vehicle system relative to at least one remote vehicle system based at least in part on the location of interest of the leak in the brake system that is determined.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide vehicle control systems (and related methods) that may (i) determine a brake assessment of a brake system (e.g., monitor the performance of vehicle brake systems to track the health of the brake systems and predict performance of the brake systems, and/or quickly determine a location of a vehicle in a multi-vehicle system associated with an unintended or undesired brake application), and (ii) use the brake assessment as a basis for controlling vehicle movement relative to other, remote vehicles and/or as a basis for modifying positive train control (PTC) or other positive vehicle control (PVC) operations.

While one or more embodiments described herein relates to air brake systems of rail vehicles, not all embodiments are limited to rail vehicles. For example, one or more embodiments may be used in connection with the brake systems of other types of vehicles, such as trucks with or without trailers.

Figure 1:
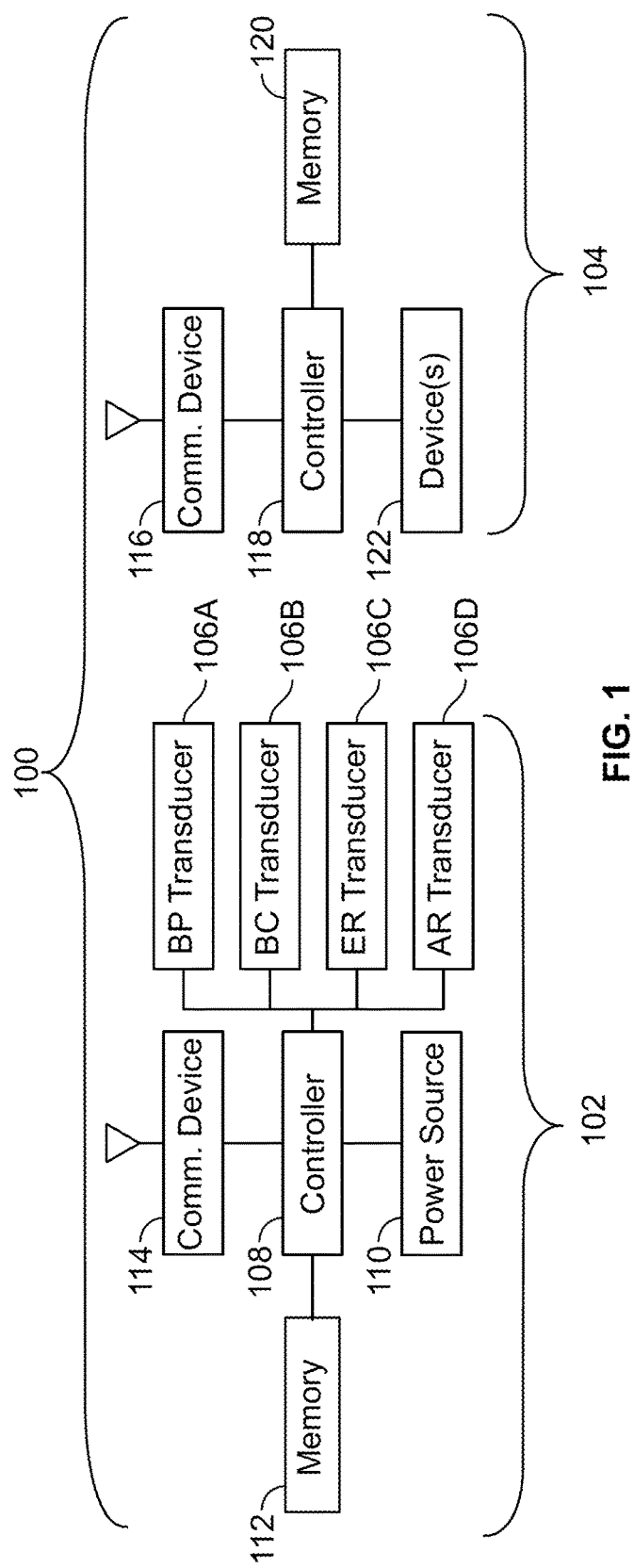
FIG. 1 illustrates one example of a brake health monitoring system.
Figure 2:
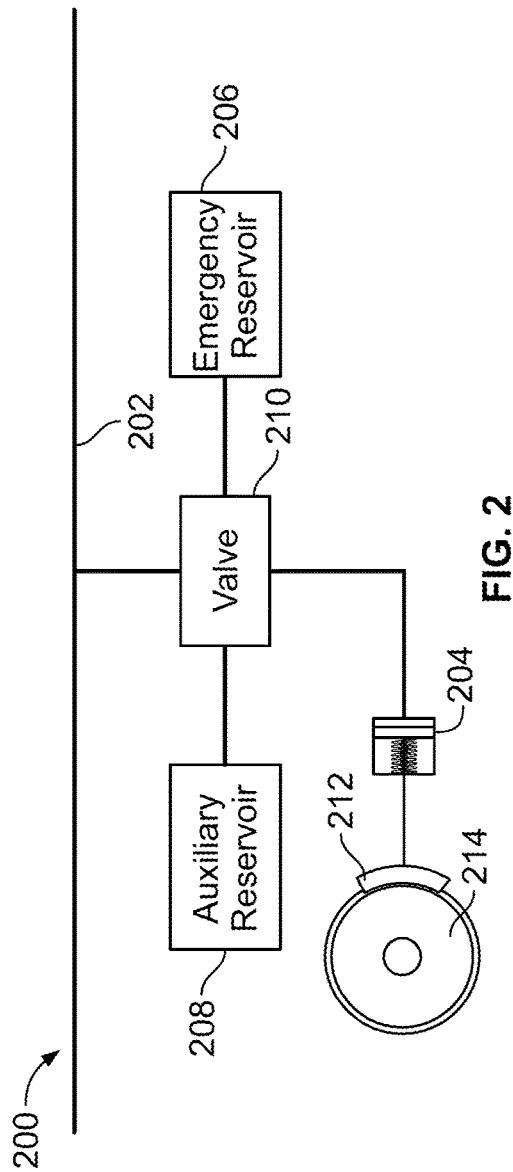
FIG. 2 illustrates one example of a brake system.

FIG. 1 illustrates one example of a brake health monitoring system 100. The monitoring system may be disposed onboard a vehicle system having a brake system 200 (shown in FIG. 2) that operates to slow or stop movement of the vehicle system. One example of a portion of the brake system that is disposed onboard a vehicle in the vehicle system is shown in FIG. 2. The monitoring system includes one or more sensor assemblies 102 and a control assembly 104. The sensor assembly may be disposed onboard one or more vehicles in the vehicle system. For example, in a rail vehicle system, one or more rail cars (or other non-propulsion-generating vehicles) may have an onboard sensor assembly and a locomotive (or other propulsion-generating vehicle) may have the control assembly onboard.

The sensor assembly includes several sensors 106A-D. While four sensors are shown, optionally, a different number of sensors or only a single sensor may be provided. The sensors can be pressure sensors, such as pressure transducers, that measure pressures in the brake system. For example, the sensors can be transducers that measure air pressures in different locations in the brake system. In the illustrated embodiment, the sensors include a brake pipe transducer 106A ("BP Transducer" in FIG. 1) that can be placed within and measure air pressure in a brake pipe 202 or portion of the brake pipe in the vehicle on which the sensor assembly is disposed. The sensors include a brake cylinder transducer 106B ("BC Transducer" in FIG. 1) that can placed within and measure air pressure in a brake cylinder 204 in the vehicle on which the sensor assembly is disposed.

The sensors include an emergency reservoir transducer 106C ("ER Transducer" in FIG. 1) that can be placed in and measure air pressure in an emergency reservoir 206 in the vehicle on which the sensor assembly is disposed. The sensors include an auxiliary reservoir transducer 106D ("AR Transducer" in FIG. 1) that can be placed in and measure air pressure in an auxiliary reservoir 208 in the vehicle on which the sensor assembly is disposed. In operation, a compressor of the vehicle system pressurizes air in the auxiliary reservoir and emergency reservoir. Compressed air also is distributed along the vehicle system via the brake pipe. The brake pipe is coupled with the auxiliary reservoir and the emergency reservoir on the vehicle (e.g., through a valve 210, such as a triple valve, distributor, or other valve). Air flows between the auxiliary reservoir and the brake cylinder through the valve or distributor. Increasing the air pressure in the brake pipe causes brakes 212 to move away from a wheel 214 of the vehicle and release, while decreasing the air pressure causes the brakes to move toward and engage the wheel via the brake cylinder.

An assembly controller 108 receives measurements output by the sensors. The assembly controller can represent hardware circuitry that includes and/or is connected with one or more processors (e.g., one or more field programmable gate arrays, one or more integrated circuits, one or more microcontrollers, etc.) that can obtain air pressure measurements from the sensors.

The assembly controller can store one or more of the pressure measurements from the sensors in a tangible and non-transitory computer-readable storage medium, such as a computer memory 112. The assembly controller can communicate one or more of these measurements to an external location via a communication device 114. The communication device represents transceiving hardware, such as one or more antennas, transceivers, or the like. Optionally, the communication device can include or represent a radio frequency identification (RFID) tag that wirelessly communicates the pressure measurements responsive to being interrogated by an RFID reader.

The sensor assembly can be powered by an onboard power source 110, such as one or more batteries. Optionally, if the vehicle on which the sensor assembly has power from another source, such as a generator or alternator, the sensor assembly can be powered by this other source.

The control assembly may be disposed onboard the same vehicle as the sensor assembly or onboard another vehicle. The control assembly includes a communication device 116 (e.g., transceiving hardware) that allows the control assembly to communicate with the sensor assembly or sensor assemblies. The communication device 116 can receive pressure measurements from the sensor assembly and provide the measurements to a system controller 118. The system controller can represent hardware circuitry that includes and/or is connected with one or more processors that examine the pressure measurements as described herein. Optionally, the assembly controller can examine the pressure measurements as described herein.

The system controller can record one or more of the pressure measurements and/or results of examination of the pressure measurements in a tangible and non-transitory computer-readable storage medium, such as a computer memory 120. Optionally, the system controller can generate and communicate one or more signals to another device 122. For example, the system controller can generate an output signal that causes an output device (e.g., an electronic display, a speaker, a light, etc.) to generate a notification or warning to inform an operator of a potential fault or need for maintenance or inspection based on the examination of the pressure measurements. As another example, the system controller can generate a control signal that changes operation of the vehicle system based on examination of the measured pressures. For example, the system controller can control a propulsion system and/or brake system of the vehicle system to slow or stop movement of the vehicle system, can steer the vehicle system toward a location where inspection, maintenance, or repair of the brake system can be performed, or the like.

In operation, the brake monitoring system can monitor pressures measured in the emergency reservoir, the brake pipe, the brake cylinder, and/or the auxiliary reservoir and determine acceptable levels of pressure to determine the state of the brake system in real time (e.g., as the vehicle system is moving and/or the brake system is being used). Optionally, the brake monitoring system can predict when repair or replacement of the brake system is needed based on the measured pressures. The decision parameter on which the analysis of the state of the brake system is determined may be a reference pressure differential, such as a difference between two or more of the measured pressures, a comparison between two or more pressures, or the like. For example, the state of the brake system can be determined based on a difference or comparison of the emergency reservoir pressure and the brake pipe pressure, a difference or comparison of the emergency reservoir pressure and the auxiliary reservoir pressure, etc.

The monitoring system can operate in different modes, such as a wake-up mode that is active when the monitoring system begins analysis of the brake system, a smaller reduction monitor mode that is active when a reduction in the pressure in the brake pipe is less than a first designated threshold (e.g., five to eight pounds per square inch, psi, or another value), a larger reduction monitor mode that is active when a reduction in the brake pipe pressure is no less than the first threshold (e.g., at least nineteen psi), and a low pressure monitor mode that is active when the pressure in the brake pipe is less than a lower, second designated threshold, such as five psi (or another value). Depending on which mode is active, different allowable values for the brake cylinder pressures, for differences between the emergency reservoir pressures and the brake pipe pressures, and for leakage of the reservoirs and brake cylinder pressures are used to determine if an error or alarm is to be activated (e.g., responsive to the measured values falling outside the applicable values).

FIGS. 3A through 3D illustrate a flowchart of one example of a method 300 for monitoring the health of a brake system. The method can be used to monitor the state of a brake system of a vehicle and optionally to predict when service or inspection of the brake system is needed. The method can operate in real time—for example, the method can be performed by the monitoring system while the vehicle system is moving and using (or attempting to use) the brake system to slow or stop movement of the vehicle system. The system controller and/or assembly controller can perform the calculations and analysis described in connection with the method based on pressure measurements received from the pressure sensors.

Figure 3A:
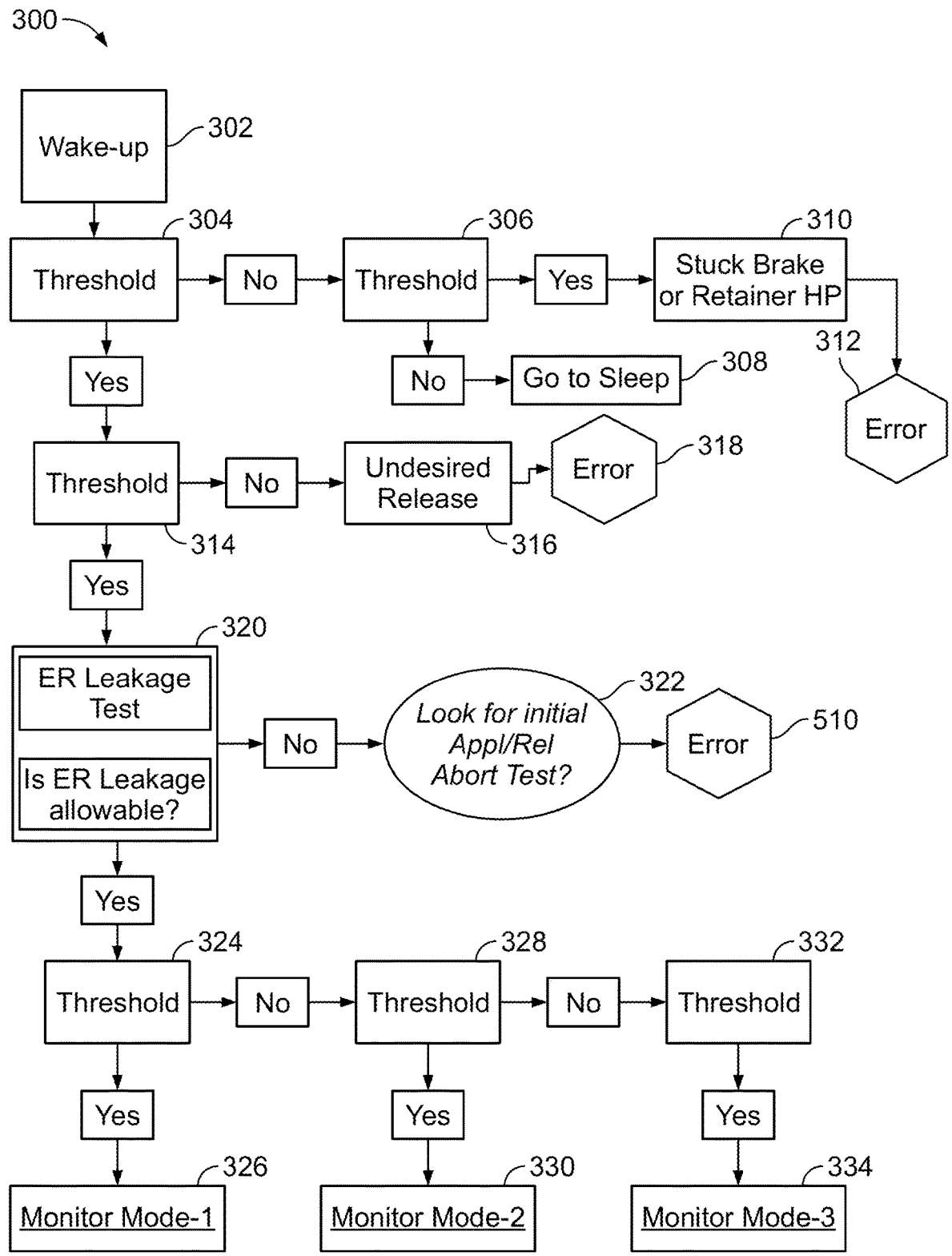
FIG. 3A illustrates an example of one portion of a flowchart for a method of monitoring a health state of a brake system.

At step 302 in FIG. 3A, the monitoring system wakes up to begin the monitoring process. For example, the sensor assembly may be in a standby or inactive state to conserve energy. The sensor assembly may activate or turn on at regularly scheduled times (e.g., periodically), responsive to receiving a signal (e.g., from the system controller, from an RFID reader, from an operator, or the like), and/or at non-regularly scheduled times (e.g., at irregular times).

At step 304, a determination is made as to whether a reference pressure differential exceeds a first threshold. For example, the difference between the pressure measured by the emergency reservoir sensor 106C and the pressure measured by the brake pipe sensor 106A can be determined. This differential can be compared to a first pressure threshold, such as five psi. Alternatively, another pressure may be used as the threshold, such as three psi, seven psi, ten psi, or the like.

If the differential between the emergency reservoir pressure and the brake pipe pressure does not exceed the low pressure threshold, then the pressure in the emergency reservoir and the brake pipe indicates that the brakes may not have been recently applied. As a result, flow of the method can proceed toward step 306. But, if the differential between the emergency reservoir pressure and the brake pipe pressure is at least as large as the low pressure threshold, then the pressure in the emergency reservoir and the brake pipe may indicate that the brakes have been recently applied or there is a potential issue with the brake system. As a result, flow of the method can proceed toward step 314.

At step 306, a determination is made as to whether the pressure in the brake cylinder is greater than a second pressure threshold. This pressure threshold may be the same first pressure threshold described above in connection with step 304. Alternatively, the second pressure threshold may be larger or smaller than the first pressure threshold. If the pressure in the brake cylinder is greater than the second pressure threshold, then the increased pressure can indicate that the brakes have not been recently applied and that the pressures in the brake system indicate a healthy brake system (or portion of the brake system onboard a vehicle). As a result, this cycle or instance of the method can end at step 308. The sensor assembly can return to a sleep state, an inactive state, or be turned off until the sensor assembly wakes up to perform another cycle or instance of the method (e.g., as described above at step 302).

But, if the pressure in the brake cylinder is greater than the second pressure threshold, then this increased brake cylinder pressure (and the emergency reservoir pressure and brake pipe pressure differential being not greater than the first threshold) can indicate a potential issue or problem with the brake system. For example, the brake may be identified as being stuck in an engaged state against the wheel, a retainer (e.g., check valve) in the brake cylinder may be stuck in a high pressure state or position, or the like. At step 310, the analysis controller and/or system controller can determine that the brake and/or retainer valve is stuck in position and not moving. One or more responsive actions 312 may be implemented in response to making this determination. For example, the analysis controller and/or system controller can cause a message (e.g., an error code) to be displayed or otherwise presented to an operator. This message can state that the brake is stuck and/or the retainer valve is stuck in a high pressure state or position. Optionally, the analysis controller and/or system controller can automatically engage the brake to try and release the stuck brake and/or retainer valve. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

Returning to the description of the decision made at step 304, if the reference pressure differential between the emergency reservoir pressure and the brake pipe pressure is greater than the first pressure threshold, this differential can indicate that the brake has been recently engaged. Flow of the method can proceed toward step 314. At step 314, the cylinder pressure is determined and compared to a third pressure threshold. This third pressure threshold is the same as the second pressure threshold in one embodiment. Alternatively, the third pressure threshold may be another value (e.g., a greater or lesser pressure). If the cylinder pressure is not greater than this third pressure threshold, then the lower pressure in the brake cylinder may indicate that the brake was undesirably released or that the brake failed to engage. At step 316, a determination is made (e.g., by the analysis controller and/or system controller) that the brake was undesirably released. This may occur when the brake is commanded to remain engaged but has released from the wheel. One or more responsive actions 318 may be implemented in response to making this determination. For example, the analysis controller and/or system controller can cause a message (e.g., an error code) to be displayed or otherwise presented to an operator. This message can state that the brake is not engaged or set against the wheel (e.g., that the brake was unintentionally released). Optionally, the analysis controller and/or system controller can automatically attempt to engage the brake. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

Returning to the description of the decision made at step 314, if the cylinder pressure is greater than this third pressure threshold, then a leakage test may need to be performed on the emergency reservoir to determine whether any leakage from this reservoir is acceptable (to maintain safe operation of the brake system). As a result, flow of the method can proceed toward step 320.

At step 320, an emergency reservoir leakage test is performed and a determination of whether the amount of leakage from the emergency reservoir is acceptable. For example, leakage from the emergency reservoir can be determined and compared to a leakage threshold. If the measured leakage is more than this leakage threshold, then the measured leakage may be unacceptable, and flow of the method can proceed toward step 322. But, if the measured leakage is not more than this leakage threshold, then the measured leakage may be acceptable, and flow of the method can proceed toward step 324. One example of this emergency reservoir leakage test is described below in connection with FIG. 4.

At step 322, a determination is made as to whether there was or is an application of the brake that is resulting in the differential (between the emergency reservoir pressure and the brake pipe pressure) being greater than the first threshold, the brake cylinder pressure being greater than the third threshold, and the measured leakage from the emergency reservoir being more than the allowable amount. For example, the analysis controller and/or system controller can determine whether the brakes were engaged within a previous time period (e.g., within the previous five to ten minutes) from events recorded in the memory (e.g., an event recorder), based on input provided by an operator of the vehicle system, or the like. If the brake or brakes has or have been recently engaged, then the method may end (the test may be aborted), and one or more responsive actions optionally may be implemented (e.g., at step 510). For example, one or more responsive actions may be implemented, such as the analysis controller and/or system controller causing a message (e.g., an error code) to be displayed or otherwise presented to an operator. This message can state that there is excessive leakage from the emergency reservoir. As another example, the analysis controller and/or system controller can send a message to an off-board location to request, schedule, and/or initiate an inspection and/or repair of the brake system when the vehicle system arrives at an upcoming location. Flow of the method can then return to one or more other operations or terminate.

At step 324, a determination is made as to whether a reference pressure differential between the emergency reservoir pressure and the brake pipe pressure is less than a fourth pressure threshold. For example, a difference between (a) the prior measurement or a more recent measurement of the pressure in the emergency reservoir and (b) the prior measurement or a more recent measurement of the pressure in the brake pipe can be compared to a threshold of eighteen psi (or another value, such as ten psi, fifteen psi, twenty psi, etc.). If this difference is less than the fourth threshold, then the monitoring system may enter into a first monitoring mode at step 326. But, if this difference is not less than the fourth threshold, then the first monitoring mode may be inappropriate for determining a state of the health of the brake system. As a result, flow of the method can proceed toward step 328.

At step 328, a determination is made as to whether the differential between the emergency reservoir pressure and the brake pipe pressure is greater than a fifth pressure threshold. The fifth pressure threshold may be larger than the fourth pressure threshold used at step 324. For example, this difference can be compared to a threshold of twenty-five psi (or another value, such as twenty psi, thirty psi, etc.). If this difference is greater than the fifth threshold, then the monitoring system may enter into a second monitoring mode at step 330. But, if this difference is not greater than the fifth threshold, then the second monitoring mode may be inappropriate for determining a state of the health of the brake system. As a result, flow of the method can proceed toward step 332.

At step 332, a determination is made as to whether the brake pipe pressure is less than a sixth pressure threshold. In one example, this sixth pressure threshold may be less than the fourth and fifth pressure thresholds. In one embodiment, the sixth pressure threshold may be the same as the first pressure threshold. If the brake pipe pressure is less than the sixth pressure threshold, then the monitoring system may enter into a third monitoring mode at step 334. But, if the brake pipe pressure is not smaller than the sixth threshold, then the method can terminate or return to step 302.

Figure 3B:
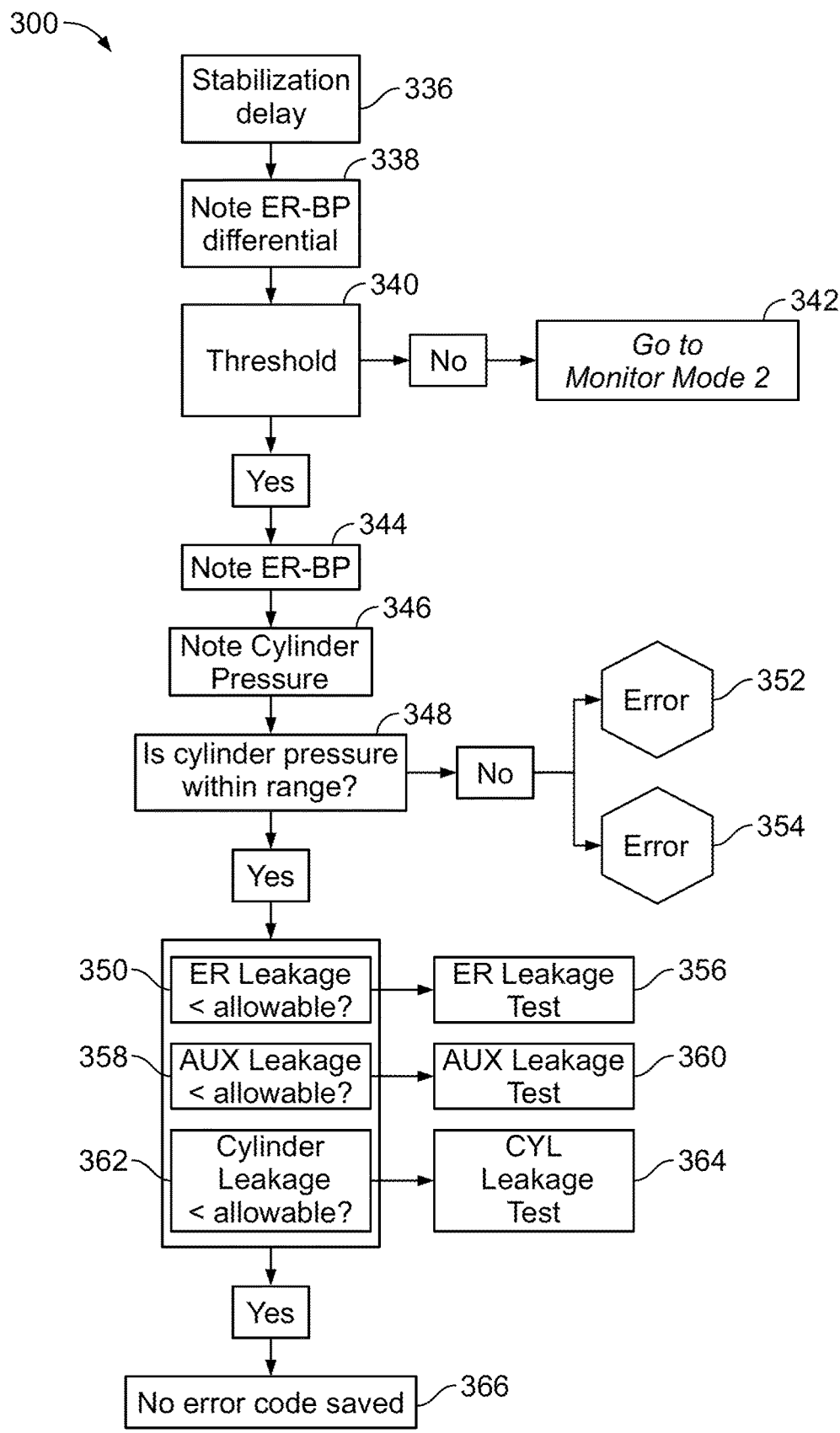
FIG. 3B illustrates an example of a first monitoring mode portion of the flowchart for the method of monitoring the health state of the brake system shown in FIG. 3A.

FIG. 3B illustrates one example of a portion of the method that includes the first monitoring mode of the monitoring system. The portion of the method shown in FIG. 3B may be performed subsequent to or part of step 326 in FIG. 3A. At step 336 in FIG. 3B, a stabilization delay is performed. The stabilization delay can include no new pressure measurements being obtained for at least a designated, non-zero period of time to permit fluctuations in the pressures to become smaller or eliminated. This period of time can be five seconds, thirty seconds, sixty seconds, or the like.

At step 338, a measurement of the emergency reservoir pressure and a measurement of the brake pipe pressure are obtained, and a reference pressure differential between the pressure measurements is determined. For example, the emergency reservoir sensor 106C and the brake pipe sensor 106A can each obtain a new measurement of the pressure in the emergency reservoir and the brake pipe, respectively. The difference between these measurements can be calculated by the system controller and/or assembly controller.

At step 340, a determination is made as to whether this differential is less than a seventh pressure threshold. This seventh pressure threshold can be greater than the fourth pressure threshold described above. For example, the seventh pressure threshold can be nineteen psi. Alternatively, the seventh pressure threshold can be smaller than the fourth pressure threshold or may be much larger than the fourth pressure threshold.

Figure 3C:
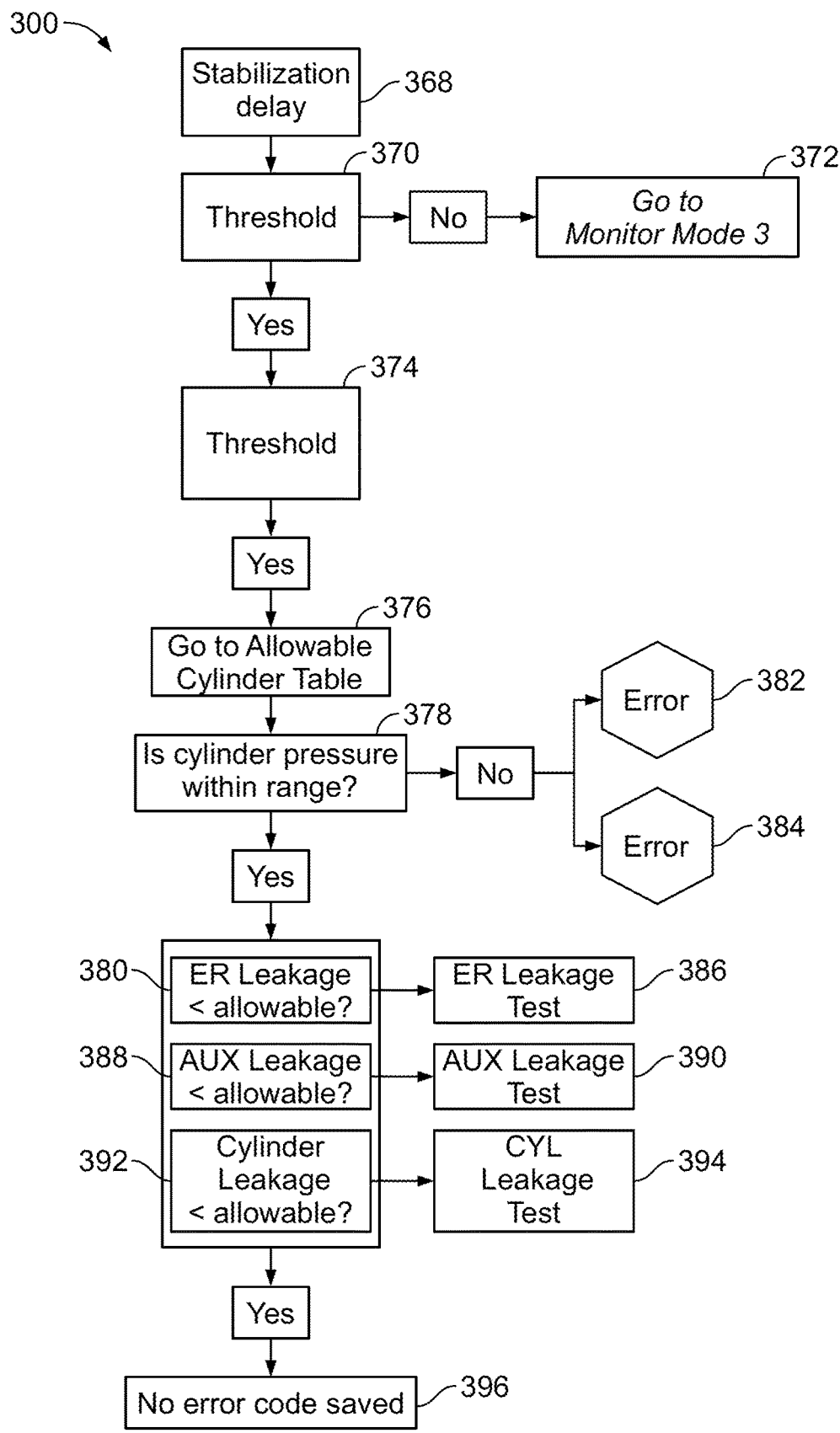
FIG. 3C illustrates an example of a second monitoring mode portion of the flowchart for the method of monitoring the health state of the brake system shown in FIG. 3A.

If the differential between the emergency reservoir pressure and the brake pipe pressure is not less than the seventh pressure threshold, then the first monitoring mode may not be appropriate for examining the health of the brake system. Instead, the method can proceed to the second monitoring mode at step 342. One example of the second monitoring mode is shown in FIG. 3C. But, if the differential between the emergency reservoir pressure and the brake pipe pressure is less than the seventh pressure threshold, then the method can proceed toward step 344. At step 344, additional measurements of the emergency reservoir pressure and the brake pipe pressure are made, and the differential between these pressures can be calculated again.

At step 346, the brake cylinder pressure is measured. At step 348, a determination is made as to whether the brake cylinder pressure is within an acceptable range of pressures. The acceptable range of pressures that is used for this determination can be selected from several different ranges of pressures stored in at least one of the memories. Different ranges of these pressures can be associated with different differentials between the emergency reservoir pressure and the brake pipe pressure. The differential that is determined at step 344 can be used to select one of these ranges of pressures. The brake cylinder pressure is compared to the selected range of pressures. If the brake cylinder pressure is within the selected range of pressures, then flow of the method can proceed toward step 350.

But, if the brake cylinder pressure is not within the selected range of pressures, then flow of the method can proceed toward step 352 or step 354. The method can proceed toward step 352 if the brake cylinder pressure is lower than the selected range of pressures. For example, if the differential determined at step 344 is fifteen psi and the brake pipe pressure (also determined at step 344) is seventy-five psi, then the selected range of acceptable brake cylinder pressures may be 32.6 psi to 43.5 psi. If the brake cylinder pressure is less than 32.6 psi, then the method can implement one or more responsive actions at step 352. For example, the analysis controller and/or system controller can cause a message (e.g., an error code) to be displayed or otherwise presented to an operator. This message can state that the brake cylinder pressure is too low. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

Returning to the description of the decision made at step 348, the method can proceed toward step 354 if the brake cylinder pressure greater than the selected range of pressures. For example, if the differential determined at step 344 is fifteen psi and the brake pipe pressure (also determined at step 344) is seventy-five psi, then the selected range of acceptable brake cylinder pressures may be 32.6 psi to 43.5 psi. If the brake cylinder pressure is greater than 43.5 psi, then the method can implement one or more responsive actions at step 354. For example, the analysis controller and/or system controller can cause a message (e.g., an error code) to be displayed or otherwise presented to an operator. This message can state that the brake cylinder pressure is too high. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

On the other hand, if the method proceeds toward step 350 from step 348 due to the brake cylinder pressure being within the selected range of pressures, then one or more leakage tests may be performed. In the illustrated example, leakage from the emergency reservoir can be measured at step 350, similar to as described above in connection with step 320 in FIG. 3A. For example, the emergency reservoir pressure may be monitored for an extended period of time (e.g., several seconds or minutes) to determine whether the pressures is decreasing with respect to time. The amount of this decrease and/or the rate at which the pressure is decreasing can be compared to a leakage threshold and/or a leakage rate threshold associated with the emergency reservoir. If the measured leakage from the emergency reservoir is more than the corresponding threshold associated with the emergency reservoir, then the measured leakage may be unacceptable, and flow of the method can proceed toward step 356. At step 356, the emergency reservoir leakage test can be performed. One example of this emergency reservoir leakage test is described below in connection with FIG. 4. If the measured leakage from the emergency reservoir is acceptable, however, then flow of the method can proceed from step 350 toward step 358.

At step 358, leakage from the auxiliary reservoir can be measured. For example, the auxiliary reservoir pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the auxiliary reservoir. If the amount and/or rate of leakage is greater than the corresponding threshold, then flow of the method can proceed toward step 360. At step 360, an auxiliary reservoir leakage test can be performed. One example of this auxiliary reservoir leakage test is described below in connection with FIG. 5. If the amount and/or rate of leakage is not greater than the corresponding threshold, then flow of the method can proceed toward step 362.

At step 362, leakage from the brake cylinder can be measured. For example, the brake cylinder pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the brake cylinder. If the amount and/or rate of leakage is greater than the corresponding threshold, then flow of the method can proceed toward step 364. At step 364, brake cylinder leakage test can be performed. One example of this brake cylinder leakage test is described below in connection with FIG. 6. If the amount and/or rate of leakage is not greater than the corresponding threshold, then flow of the method can proceed toward step 366.

If the measured leakages (from step 350, step 358, and step 362) are within the acceptable limits (e.g., below the associated thresholds), flow of the method may terminate at step 366 or may return to one or more other operations, such as step 302 or step 308.

FIG. 3C illustrates one example of a portion of the method that includes the second monitoring mode of the monitoring system. The portion of the method shown in FIG. 3C may be performed subsequent to or part of step 330 in FIG. 3A. At step 368 in FIG. 3C, a stabilization delay is performed. The stabilization delay can include no new pressure measurements being obtained for at least a designated, non-zero period of time to permit fluctuations in the pressures to become smaller or eliminated. This period of time can be five seconds, thirty seconds, sixty seconds, or the like.

At step 370, a measurement of the brake pipe pressure is obtained, and the brake pipe pressure is compared to a pressure threshold. In the illustrated example, this threshold is the first threshold (e.g., five psi), but optionally may be a higher or lower pressure.

Figure 3D:
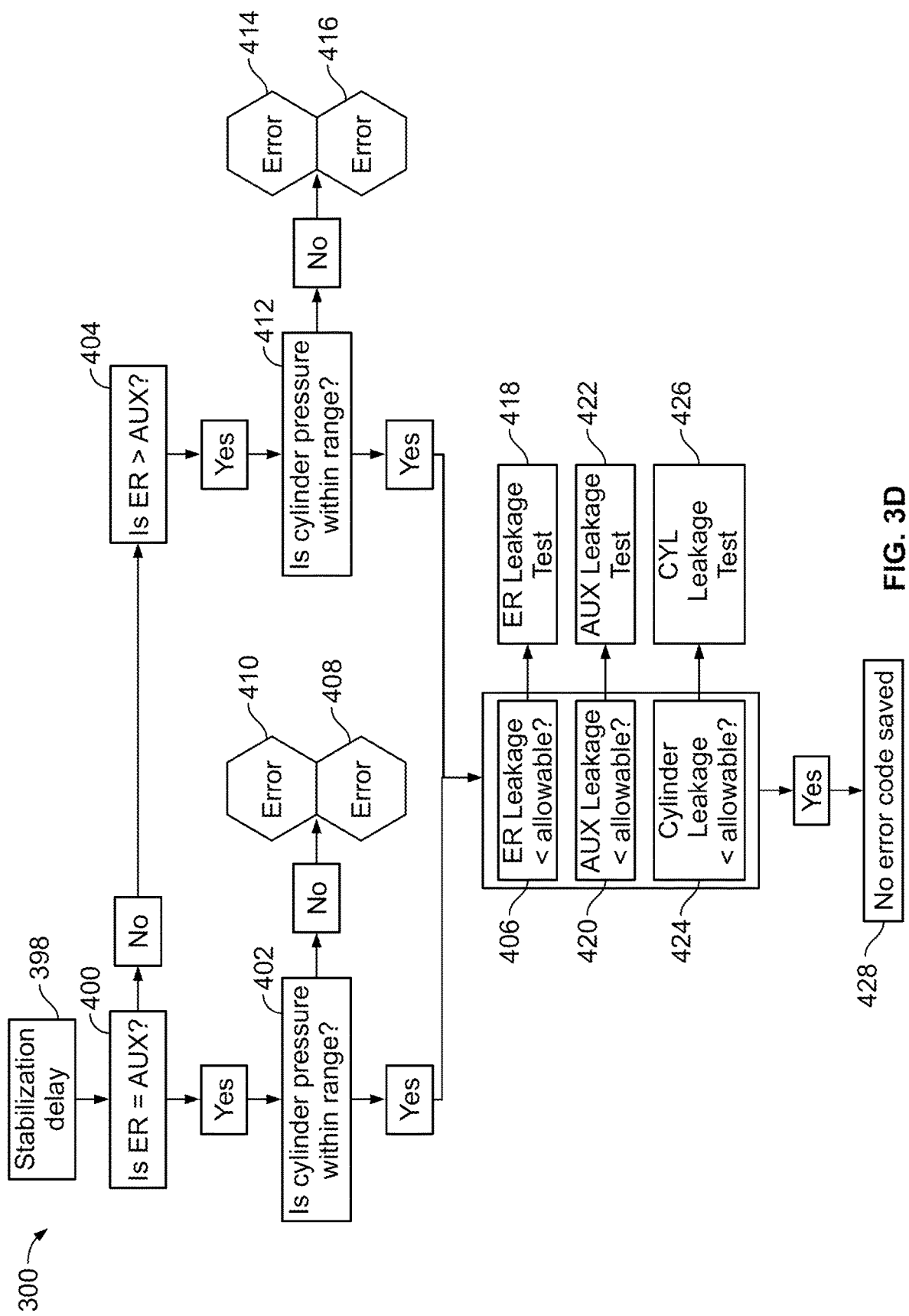
FIG. 3D illustrates an example of a third monitoring mode portion of the flowchart for the method of monitoring the health state of the brake system shown in FIG. 3A.

If the brake pipe pressure is not less than the threshold, then the second monitoring mode may not be appropriate for examining the health of the brake system. Instead, the method can proceed to the third monitoring mode at step 372. One example of the third monitoring mode is shown in FIG. 3D. But, if the brake pipe pressure is greater than the pressure threshold, then the method can proceed toward step 374.

At step 374, additional measurements of the emergency reservoir pressure and the brake pipe pressure are made, and the reference pressure differential between these pressures can be calculated again, and this differential can be compared to another pressure threshold. In the illustrated example, this threshold is nineteen psi. Optionally, the pressure threshold may be higher or lower. If the differential is greater than this threshold, then further examination of the brake system may be needed to evaluate the state of health of the brake system. As a result, flow of the method can proceed toward step 376. If the differential is not greater than the threshold, then no further examination of the brake system may be needed to evaluate the state of health of the brake system. As a result, flow of the method can terminate or return to another operation (e.g., step 302 or step 308).

At step 376, the brake cylinder pressure is measured, and a determination is made as to whether the brake cylinder pressure is within an acceptable range of pressures. The acceptable range of pressures that is used for this determination can be selected from several different ranges of acceptable pressures stored in at least one of the memories. Different ranges of these pressures can be associated with different brake pipe pressures and different differentials between the emergency reservoir pressure and the brake pipe pressure. The brake pipe pressure and/or emergency reservoir pressure can be measured to determine which range to compare to the brake cylinder pressure. Alternatively, a prior brake pipe pressure measurement and/or a prior emergency reservoir pressure can be used to determine which range to compare to the brake cylinder pressure. For example, if the brake pipe pressure is measured to be seventy-nine psi and the differential between the brake pipe pressure and the emergency reservoir pressure is eleven psi, then the range of acceptable pressures that is selected may include pressures from twenty-three psi to 29.8 psi. Alternatively, another range may be used.

At step 378, the brake cylinder pressure is compared to the selected range of pressures. If the brake cylinder pressure is within the selected range of pressures, then flow of the method can proceed toward step 380.

But, if the brake cylinder pressure is not within the selected range of pressures, then flow of the method can proceed toward step 382 or step 384. The method can proceed toward step 382 if the brake cylinder pressure is lower than the selected range of pressures. The method can implement one or more responsive actions at step 382. For example, the analysis controller and/or system controller can cause a message (e.g., an error code) to be displayed or otherwise presented to an operator. This message can state that the brake cylinder pressure is too low. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

Returning to the description of the decision made at step 378, the method can proceed toward step 384 if the brake cylinder pressure greater than the selected range of pressures. The method can implement one or more responsive actions at step 384. For example, the analysis controller and/or system controller can cause a message (e.g., an error code) to be displayed or otherwise presented to an operator. This message can state that the brake cylinder pressure is too high. Optionally, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

On the other hand, if the method proceeds toward step 380 from step 378 due to the brake cylinder pressure being within the selected range of pressures, then one or more leakage tests may be performed. In the illustrated example, leakage from the emergency reservoir can be measured at step 380, similar to as described above in connection with step 320 in FIG. 3A. For example, the emergency reservoir pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the emergency reservoir. If the measured leakage from the emergency reservoir is more than the corresponding threshold associated with the emergency reservoir, then the measured leakage may be unacceptable, and flow of the method can proceed toward step 386. At step 386, the emergency reservoir leakage test can be performed. One example of this emergency reservoir leakage test is described below in connection with FIG. 4. If the measured leakage from the emergency reservoir is acceptable, however, then flow of the method can proceed from step 380 toward step 388.

At step 388, leakage from the auxiliary reservoir can be measured. For example, the auxiliary reservoir pressure may be monitored for an extended period of time (e.g., several seconds or minutes) to determine whether the pressure is decreasing with respect to time. The amount of this decrease and/or the rate at which the pressure is decreasing can be compared to a leakage threshold and/or a leakage rate threshold associated with the auxiliary reservoir. If the amount and/or rate of leakage is greater than the corresponding threshold, then flow of the method can proceed toward step 390. At step 390, an auxiliary reservoir leakage test can be performed. One example of this auxiliary reservoir leakage test is described below in connection with FIG. 5. If the amount and/or rate of leakage is not greater than the corresponding threshold, then flow of the method can proceed from step 388 toward step 392.

At step 392, leakage from the brake cylinder can be measured. For example, the brake cylinder pressure may be monitored for an extended period of time (e.g., several seconds or minutes) to determine whether the pressures is decreasing with respect to time. The amount of this decrease and/or the rate at which the pressure is decreasing can be compared to a leakage threshold and/or a leakage rate threshold associated with the brake cylinder. If the amount and/or rate of leakage is greater than the corresponding threshold, then flow of the method can proceed toward step 394. At step 394, brake cylinder leakage test can be performed. One example of this brake cylinder leakage test is described below in connection with FIG. 6. If the amount and/or rate of leakage is not greater than the corresponding threshold, then flow of the method can proceed from step 392 toward step 396.

If the measured leakages (from step 380, step 388, and step 392) are within the acceptable limits (e.g., below the associated thresholds), flow of the method may terminate at step 396 or may return to one or more other operations, such as step 302 or step 308.

FIG. 3D illustrates one example of a portion of the method that includes the third monitoring mode of the monitoring method. The portion of the method shown in FIG. 3D may be performed subsequent to or part of step 334 in FIG. 3A. At step 398 in FIG. 3D, a stabilization delay is performed. The stabilization delay can include no new pressure measurements being obtained for at least a designated, non-zero period of time to permit fluctuations in the pressures to become smaller or eliminated. This period of time can be five seconds, thirty seconds, sixty seconds, or the like.

At step 400, a measurement of the emergency reservoir pressure and a measurement of the auxiliary reservoir pressure are obtained and compared with each other. For example, the emergency reservoir sensor 106C and the auxiliary reservoir sensor 106D can each obtain a new measurement of the pressure in the emergency reservoir and the brake pipe, respectively. The analysis controller and/or system controller can determine if the emergency reservoir pressure and the auxiliary reservoir pressure are equivalent to each other. For example, the analysis controller and/or system controller can determine whether a reference pressure differential between the emergency reservoir pressure and the auxiliary reservoir pressure is less than a threshold. Optionally, the analysis controller and/or system controller can determine if the emergency reservoir pressure and the auxiliary reservoir pressure are substantially equivalent to each other, such as being within a measurement error of each other or being within a designated range of each other (such as two psi).

If the emergency reservoir pressure and the auxiliary reservoir pressure are equal to each other or substantially equal to each other, then flow of the method can proceed toward step 402 to examine the brake cylinder pressure and determine if the brake cylinder pressure is within one or more elevated pressure ranges. But, if the emergency reservoir pressure and the auxiliary reservoir pressure are not equal to each other or not substantially equal to each other, then flow of the method can proceed toward step 404 to determine whether the emergency reservoir pressure is greater than the auxiliary reservoir pressure.

At step 402, the brake cylinder pressure is measured and compared to a selected range of acceptable pressures. The range of acceptable pressures that is used for this determination can be selected from a first set of several different ranges of pressures stored in at least one of the memories. Different ranges of these pressures can be associated with different brake pipe pressures. For example, a previous measurement of the brake pipe pressure (e.g., the measurement obtained for the determination at step 324, step 328, and/or step 332) or a new measurement of the brake pipe pressure can be obtained. The range of pressures associated with the brake pipe pressure can be selected and compared to the brake cylinder pressure. For example, if the brake pipe pressure is less than five psi, then the selected range of pressures may be 63.5 psi to 79.4 psi. If the brake cylinder pressure is within this range, then the brake cylinder pressure is within allowable limits and flow of the method can proceed toward step 406. But, if the brake cylinder pressure is outside of this range, then the brake cylinder pressure is outside of the allowable limits. Flow of the method can proceed toward step 408 or step 410.

If the brake cylinder pressure is above the range, then flow of the method can proceed toward step 408. For example, if the brake cylinder pressure is greater than the upper limit of the selected range of acceptable pressures, then the brake cylinder pressure may be too large. If the brake cylinder pressure is below the range, then flow of the method can proceed toward step 410. For example, if the brake cylinder pressure is lower than the lower limit of the selected range of acceptable pressures, then the brake cylinder pressure may be too low. At step 408, one or more responsive actions may be implemented. For example, the analysis controller and/or system controller can cause a message (e.g., an error code) to be displayed or otherwise presented to an operator. This message can state that the brake cylinder pressure is higher than expected for an emergency application of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

At step 410, one or more responsive actions may be implemented. For example, the analysis controller and/or system controller can cause a message (e.g., an error code) to be displayed or otherwise presented to an operator. This message can state that the brake cylinder pressure is lower than expected for an emergency application of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

Returning to the decision made at step 402 (whether the emergency and auxiliary reservoir pressures are equal or substantially equal), if the reservoir pressures are not equal or substantially equal to each other, flow of the method can proceed toward step 404. At step 404, a determination is made as to whether the emergency reservoir pressure is greater than the auxiliary reservoir pressure. If the emergency reservoir pressure is greater than the auxiliary reservoir pressure, then flow of the method can proceed toward step 412 to determine whether the brake cylinder pressure is acceptable. But, if the emergency reservoir pressure and the auxiliary reservoir pressure are not equal (or substantially equal) and the auxiliary pressure is greater than the emergency reservoir pressure, then the method may terminate or return to another operation (e.g., step 302 or step 308).

At step 412, the brake cylinder pressure is measured and compared to a selected range of acceptable pressures. The range of acceptable pressures that is used for this determination can be selected from a second set of several different ranges of pressures stored in at least one of the memories. Different ranges of these pressures can be associated with different brake pipe pressures. For example, a previous measurement of the brake pipe pressure (e.g., the measurement obtained for the determination at step 324, step 328, and/or step 332) or a new measurement of the brake pipe pressure can be obtained. Additionally, the first set of pressure ranges examined at step 402 may be different from the second set of pressure ranges examined at step 412. For example, the ranges of allowable pressures in the second set may be lower than a majority of the ranges of allowable pressures in the first set. The range of pressures associated with the brake pipe pressure can be selected and compared to the brake cylinder pressure. For example, if the brake pipe pressure is less than five psi, then the selected range of pressures may be 51.3 psi to 66.6 psi. If the brake cylinder pressure is within this range, then the brake cylinder pressure is within allowable limits and flow of the method can proceed toward step 406. But, if the brake cylinder pressure is outside of this range, then the brake cylinder pressure is outside of the allowable limits. Flow of the method can proceed toward step 414 or step 416.

If the brake cylinder pressure is above the range, then flow of the method can proceed toward step 416. For example, if the brake cylinder pressure is greater than the upper limit of the selected range of acceptable pressures, then the brake cylinder pressure may be too large. If the brake cylinder pressure is below the range, then flow of the method can proceed toward step 414. For example, if the brake cylinder pressure is lower than the lower limit of the selected range of acceptable pressures, then the brake cylinder pressure may be too low.

At step 416, one or more responsive actions may be implemented. For example, the analysis controller and/or system controller can cause a message (e.g., an error code) to be displayed or otherwise presented to an operator. This message can state that the brake cylinder pressure is higher than expected for a full service application of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

At step 414, one or more responsive actions may be implemented. For example, the analysis controller and/or system controller can cause a message (e.g., an error code) to be displayed or otherwise presented to an operator. This message can state that the brake cylinder pressure is lower than expected for a full service of the brake system. As another example, the analysis controller and/or system controller can send a message to an off-board location to request, schedule, and/or initiate an inspection and/or repair of the brake system when the vehicle system arrives at an upcoming location. Flow of the method can then terminate or return to one or more other operations, such as step 302 or step 308.

Returning to the decisions made at step 402 and/or step 412, if the brake cylinder pressure is within the range of acceptable pressures, flow of the method can proceed to one or more leakage tests, as described above. For example, at step 406, leakage from the emergency reservoir can be measured (similar to as described above in connection with step 350 in FIG. 3B) and compared to a leakage threshold and/or a rate threshold. If the measured leakage from the emergency reservoir is more than the corresponding threshold associated with the emergency reservoir, then the measured leakage may be unacceptable, and flow of the method can proceed toward step 418. At step 418, the emergency reservoir leakage test can be performed, similar to as described above at step 356 in FIG. 3B. One example of this emergency reservoir leakage test is described below in connection with FIG. 4. If the measured leakage from the emergency reservoir is acceptable, however, then flow of the method can proceed from step 406 toward step 420.

At step 420, leakage from the auxiliary reservoir can be measured, as described above in connection with step 358 in FIG. 3B. If the amount and/or rate of leakage from the auxiliary reservoir is greater than the corresponding threshold, then flow of the method can proceed toward step 422. At step 422, an auxiliary reservoir leakage test can be performed, as described above in connection with step 360 in FIG. 3B. One example of this auxiliary reservoir leakage test is described below in connection with FIG. 5. If the amount and/or rate of leakage is not greater than the corresponding threshold, then flow of the method can proceed toward step 424.

At step 424, leakage from the brake cylinder can be measured, as described above in connection with step 362 in FIG. 3B. If the amount and/or rate of leakage is greater than the corresponding threshold, then flow of the method can proceed toward step 426. At step 426, a brake cylinder leakage test can be performed, as described above in connection with step 364 in FIG. 3B. One example of this brake cylinder leakage test is described below in connection with FIG. 6. If the amount and/or rate of leakage is not greater than the corresponding threshold, then flow of the method can proceed toward step 428.

If the measured leakages are within the acceptable limits (e.g., below the associated thresholds), flow of the method may terminate following step 428 or may return to one or more other operations, such as step 302 or step 308.

Figures 4, 5:
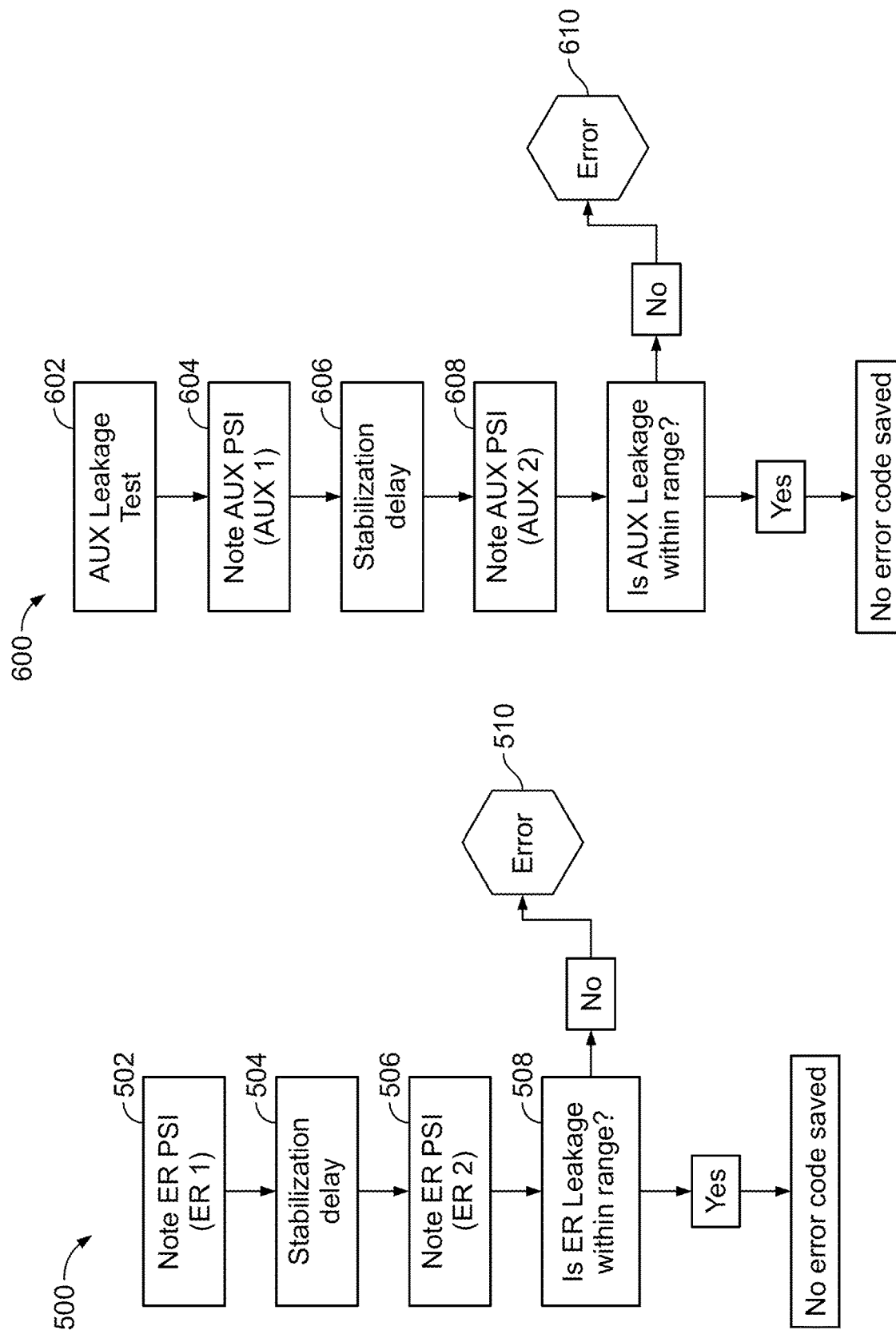
FIG. 4 illustrates one example of a flowchart of a method for an emergency reservoir leakage test.
FIG. 5 illustrates one example of a flowchart of a method for an auxiliary reservoir leakage test.

FIG. 4 illustrates a flowchart of one example of an emergency reservoir leakage test method 500. As described above, the emergency reservoir leakage test can be performed at one or more of steps 320, 350, 356, 380, 386, 406, 418. At step 502, a first measurement of the pressure in the emergency reservoir is obtained. At step 504, a measurement delay is performed. The measurement delay can include no new pressure measurements being obtained for at least a designated, non-zero period of time to permit the pressure to decrease by a measurable amount in the event that there is a leak. This period of time can be five seconds, thirty seconds, sixty seconds, or the like. At step 506, a second measurement of the pressure in the emergency reservoir is obtained. At step 508, leakage from the emergency reservoir is determined based on a difference between the first and second pressure measurements. For example, the leakage can be calculated as the difference between the first and second measurements. This leakage can be compared to a threshold pressure to determine whether there is a leak. For example, if the second pressure is at least three psi less than the first pressure and the threshold is less than three psi, then a leak may be identified at step 508. As a result, flow of the method can proceed toward step 510. If the leakage is not greater than the threshold, then no leak may be identified at step 508. As a result, flow of the method can proceed toward step 322 in FIG. 3A, toward step 358 or step 366 in FIG. 3B, toward step 388 or step 396 in FIG. 3C, or toward step 420 or step 428 in FIG. 3D.

At step 510, one or more responsive actions may be implemented in response to identifying the leak. For example, the analysis controller and/or system controller can cause a message (e.g., an error code) to be displayed or otherwise presented to an operator. This message can state that there is excessive leakage from the emergency reservoir. As another example, the analysis controller and/or system controller can send a message to an off-board location to request, schedule, and/or initiate an inspection and/or repair of the brake system when the vehicle system arrives at an upcoming location. Flow of the method can then return to one or more other operations, such as toward step 322 in FIG. 3A, toward step 358 or step 366 in FIG. 3B, toward step 388 or step 396 in FIG. 3C, or toward step 420 or step 428 in FIG. 3D.

FIG. 5 illustrates a flowchart of one example of an auxiliary reservoir leakage test method 600. As described above, the auxiliary reservoir leakage test can be performed at one or more of steps 358, 360, 388, 390, 420, 422. At step 602, a first measurement of the pressure in the auxiliary reservoir is obtained. At step 604, a measurement delay is performed. The measurement delay can include no new pressure measurements being obtained for at least a designated, non-zero period of time to permit the pressure to decrease by a measurable amount in the event that there is a leak. This period of time can be five seconds, thirty seconds, sixty seconds, or the like. At step 606, a second measurement of the pressure in the auxiliary reservoir is obtained. At step 608, leakage from the auxiliary reservoir is determined based on a difference between the first and second pressure measurements. For example, the leakage can be calculated as the difference between the first and second measurements. This leakage can be compared to a threshold pressure to determine whether there is a leak. For example, if the second pressure is at least five psi less than the first pressure and the threshold is less than five psi, then a leak may be identified at step 608. As a result, flow of the method can proceed toward step 610. If the leakage is not greater than the threshold, then no leak may be identified at step 608. As a result, flow of the method can proceed toward step 362 or step 366 in FIG. 3B, toward step 392 or step 396 in FIG. 3C, or toward step 424 or step 428 in FIG. 3D.

At step 610, one or more responsive actions may be implemented in response to identifying the leak. For example, the analysis controller and/or system controller can cause a message (e.g., an error code) to be displayed or otherwise presented to an operator. This message can state that there is excessive leakage from the auxiliary reservoir. As another example, the analysis controller and/or system controller can send a message to an off-board location to request, schedule, and/or initiate an inspection and/or repair of the brake system when the vehicle system arrives at an upcoming location. Flow of the method can then return to one or more other operations, such as toward step 362 or step 366 in FIG. 3B, toward step 392 or step 396 in FIG. 3C, or toward step 424 or step 428 in FIG. 3D.

Figure 6:
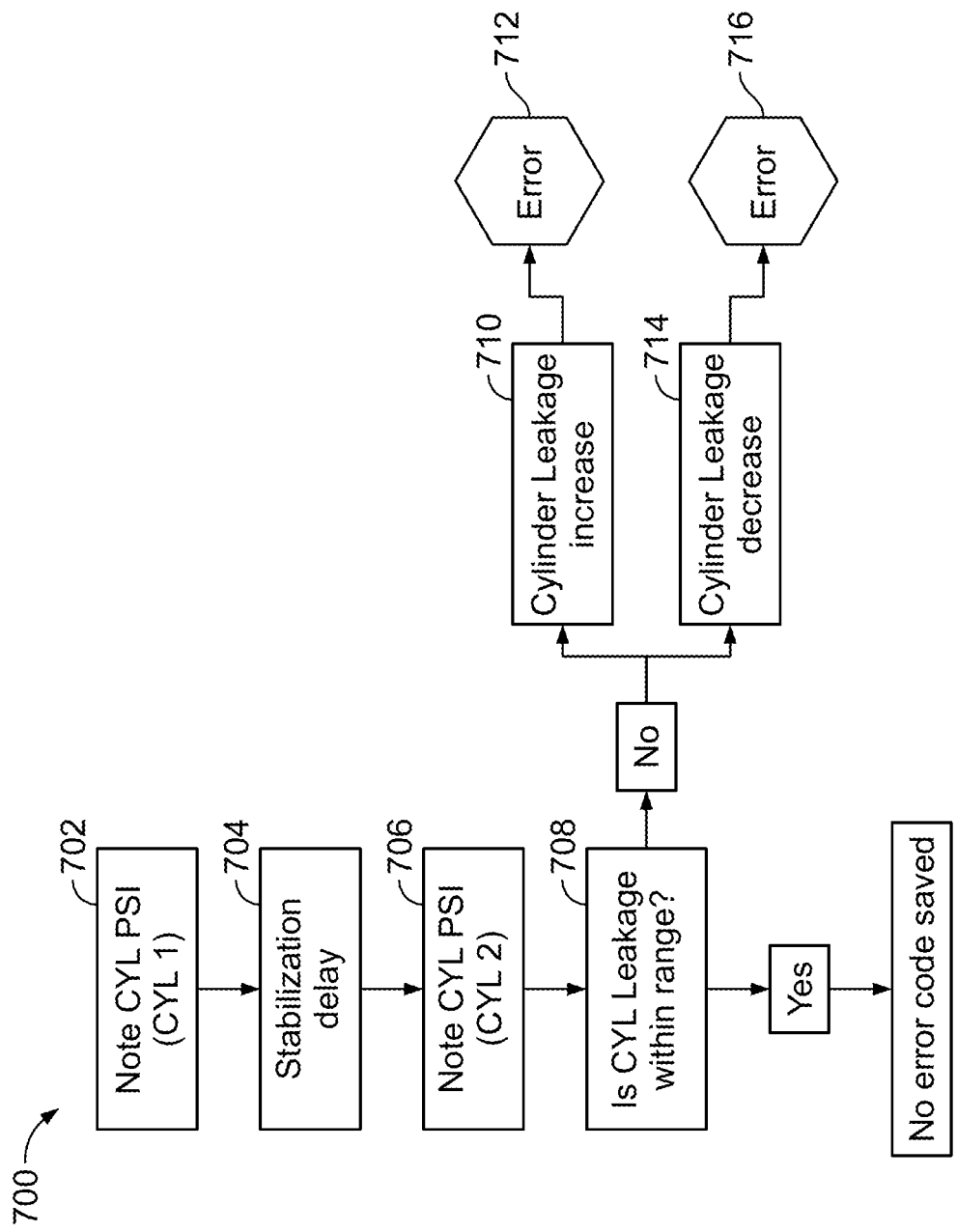
FIG. 6 illustrates one example of a flowchart of a method for a brake cylinder leakage test.

FIG. 6 illustrates a flowchart of one example of a brake cylinder leakage test method 700. As described above, the brake cylinder leakage test can be performed at one or more of steps 362, 364, 392, 394, 424, 426. At step 702, a first measurement of the pressure in the brake cylinder is obtained. At step 704, a measurement delay is performed. The measurement delay can include no new pressure measurements being obtained for at least a designated, non-zero period of time to permit the pressure to decrease by a measurable amount in the event that there is a leak. This period of time can be five seconds, thirty seconds, sixty seconds, or the like. At step 706, a second measurement of the pressure in the brake cylinder is obtained. At step 708, leakage from the brake reservoir is determined based on a difference between the first and second pressure measurements.

The leakage can be calculated as the difference between the first and second measurements and the direction of leakage can be determined based on whether the second measurement is a larger or smaller pressure than the first measurement. For example, the first pressure measurement can be subtracted from the second pressure measurement to calculate a pressure difference. If this pressure difference is a positive number that is larger than a threshold (e.g., three psi), then a leak of air into the brake cylinder may be identified at 710. As a result, one or more responsive actions may be implemented at 712 in response to identifying the leak into the brake cylinder. For example, the analysis controller and/or system controller can cause a message (e.g., an error code) to be displayed or otherwise presented to an operator. This message can state that there is leakage of air into the brake cylinder. As another example, the analysis controller and/or system controller can send a message to an off-board location to request, schedule, and/or initiate an inspection and/or repair of the brake system when the vehicle system arrives at an upcoming location.

As another example, if the pressure difference is a negative number that is larger than a threshold (e.g., the absolute value of the negative pressure difference is larger than the threshold), then a leak of air out of the brake cylinder may be identified at step 714. As a result, one or more responsive actions may be implemented at step 716 in response to identifying the leak out of the brake cylinder. For example, the analysis controller and/or system controller can cause a message (e.g., an error code) to be displayed or otherwise presented to an operator. This message can state that there is leakage of air out of the brake cylinder. As another example, the analysis controller and/or system controller can send a message to an off-board location to request, schedule, and/or initiate an inspection and/or repair of the brake system when the vehicle system arrives at an upcoming location.

But, if the difference between the pressure measurements (or the absolute value of this difference) does not exceed the threshold at step 708, then no leak may be identified. Flow of the method 700 can proceed from step 708, 712, or 716 to one or more of step 366 in FIG. 3B, step 396 in FIG. 3C, or step 428 in FIG. 3D, or may terminate.

As noted above, one or more embodiments of the inventive subject matter described herein may provide brake monitoring systems and methods that can quickly determine a location of a vehicle in a multi-vehicle system associated with an unintended or undesired brake application. An unintended or undesired brake application can include the engagement of a brake device that was not manually implemented (e.g., by moving a lever or handle, pressing a button, flipping a switch, pressing a pedal, etc.) and that was not automatically implemented (e.g., by a system that engages brakes based on sensed characteristics).

The brake monitoring system includes several sensor assemblies at different locations in a multi-vehicle system. For example, the sensor assemblies may be disposed onboard different vehicles in the multi-vehicle system. Alternatively, one or more of the sensor assemblies may be off-board the vehicles, such as in positions between the vehicles. The sensor assemblies can include a clock device, an assembly controller (e.g., a pressure switch), and a pressure sensor (e.g., a pressure transducer). The assembly controller can repeatedly monitor pressures measured by the pressure sensor and record a pressure drop event with a timestamp from the clock device that indicates when the drop in pressure occurred. The first or initial pressure drop event can be a decrease in pressure in an air brake pipe in a location measured by the pressure sensor, such as any pressure decrease, a pressure decrease above a threshold (e.g., a pressure decrease that is more than noise in the output of the sensor), or the like. The assembly controller determines the drop in brake pipe pressure and records the event with a timestamp using the clock device.

After a designated delay (e.g., two seconds), the assembly controller obtains another pressure measurement from the pressure sensor. If this subsequent pressure measurement is below a threshold (e.g., below ten pounds per square inch, or psi, or another pressure), is more than a designated threshold (e.g., the decrease is at least twenty psi, at least thirty psi, at least forty psi, or the like), etc., then the assembly controller determines that a designated brake application has occurred. This designated brake application can be an emergency brake application that was not manually or automatically implemented by a computerized control system, as one example.

Because the pressure drop may propagate along the length of the brake pipe and the length of the air brake system, different sensor assemblies may detect the first or initial pressure drops associated with the designated brake application at different times. A system controller may obtain the timestamps from plural different sensor assemblies and compare these timestamps. In one example, the system controller may modify one or more of the timestamps to account for drift in one or more of the clock devices. The system controller can identify which sensor assembly provided the earliest timestamp (relative to all other sensor assemblies in the same vehicle system) and determine that the location of the leak in the air brake system is near the identified sensor assembly. For example, the system controller can determine that the leak is most likely closer to the identified sensor assembly than one or more (or all) other sensor assemblies. The system controller can store locations of the different sensor assemblies in the vehicle system to determine the location (e.g., the vehicle) in which the leak occurred.

Figure 7:
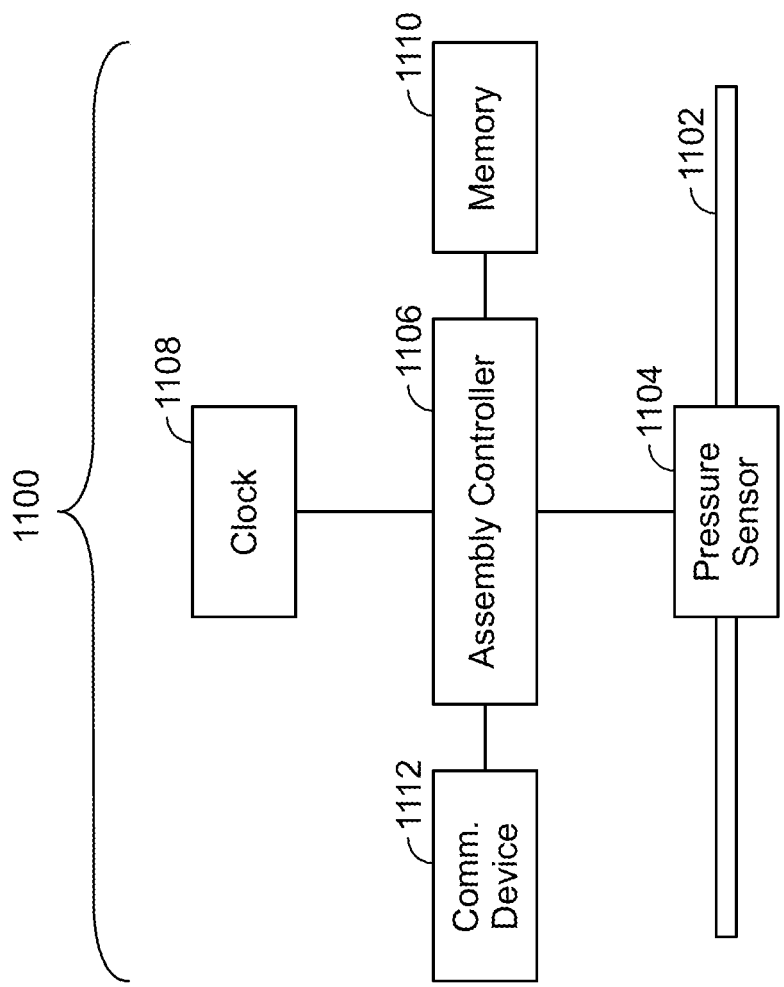
FIG. 7 illustrates one example of a sensor assembly.

FIG. 7 illustrates one example of a sensor assembly 11100. The sensor assembly can be used to monitor pressures within an air brake pipe 11102 of an air brake system in a vehicle system. The sensor assembly also can monitor times at which reductions in pressures occur to help identify a location of a leak in the brake system (referred to as a location of interest). The sensor assembly includes a pressure sensor 11104 fluidly coupled with the air brake line. The pressure sensor can be a pressure transducer in one embodiment. The pressure sensor can repeatedly measure the pressure of the air in the air brake line. An assembly controller 11106 represents hardware circuitry that controls operation of the sensor assembly. The assembly controller can include a pressure switch that is closed (or opened) responsive to a decrease in pressure in the brake pipe. Optionally, the assembly controller can include one or more processors (e.g., one or more microprocessors, field programmable gate arrays, integrated circuits, or the like) that perform the operations described in connection with the assembly controller.

The assembly controller can then wait for a designated period of time (e.g., two seconds or another length of time) to measure the pressure in the brake pipe again (using the pressure sensor). If the assembly controller determines that this additional pressure measurement indicates that the pressure in the brake pipe has decreased below a threshold (e.g., ten psi or another value) and/or that the pressure has dropped by a threshold amount, then this drop in pressure can indicate a brake application, such as an unintended emergency brake application, which may be caused by a leak in the brake system. If the pressure does not decrease below the threshold amount and/or does not decrease by at least a threshold amount between the initial and subsequent pressure measurements, then this may indicate that a brake application (unintended or otherwise) has not occurred.

A clock device 11108 ("Clock" in FIG. 7) can track passage of time. The assembly controller can determine a time at which the pressure dropped (e.g., before the secondary measurement is obtained after the designated delay) from the clock device. The time at which the initial pressure drop is detected and/or one or more of the pressure measurements optionally can be stored in a tangible and non-transitory computer readable storage medium, or computer memory 1110. The time at which the pressure initially dropped and/or one or more of the pressure measurements can be communicated from the sensor assembly to a system controller (described herein) using a communication device 1112 of the sensor assembly. The communication device can represent hardware that communicates data signals via conductive pathways and/or wirelessly. For example, the communication device can represent modems, transceivers, antennas, or the like.

Figure 8:
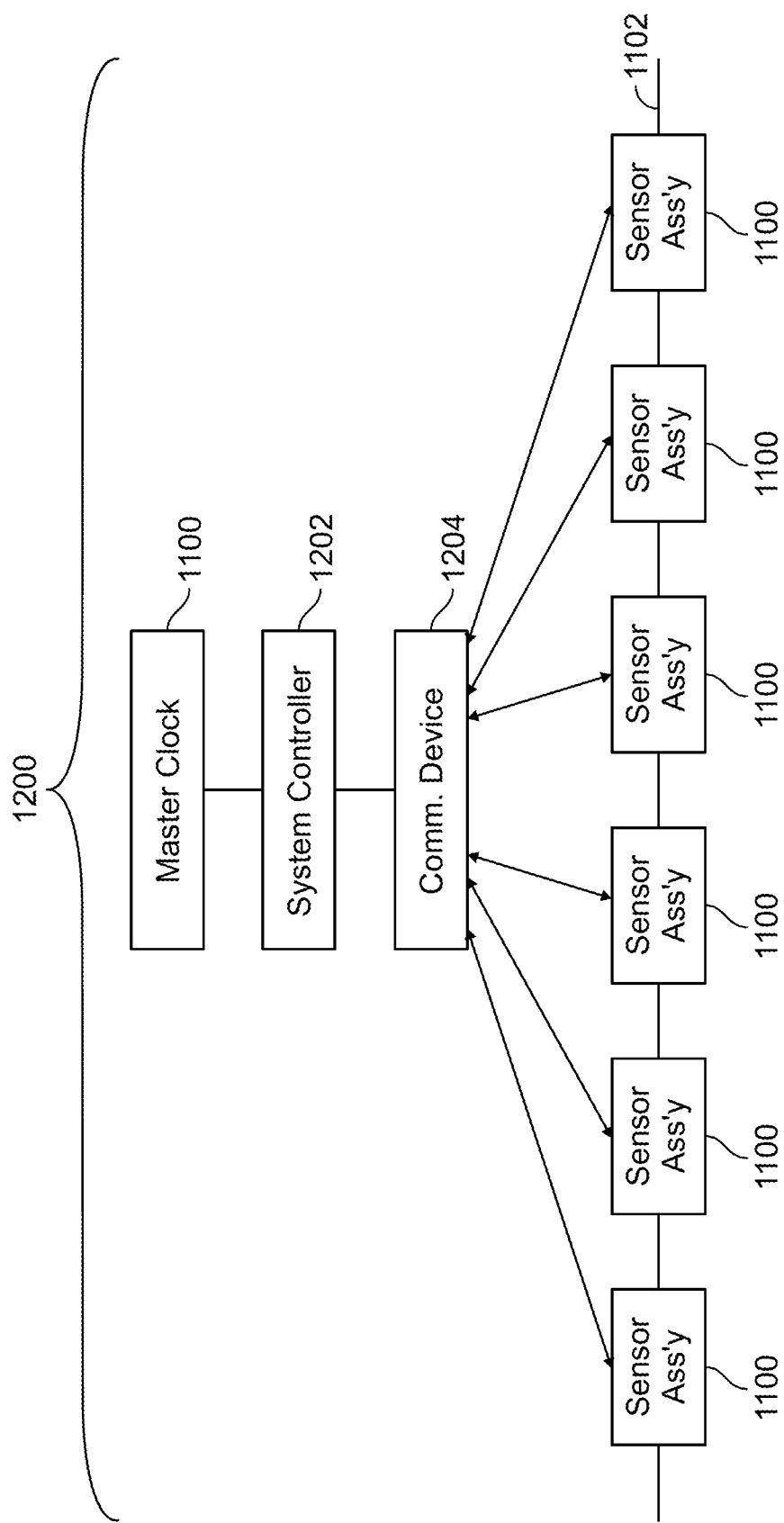
FIG. 8 illustrates one example of a brake monitoring system.

FIG. 8 illustrates one example of a brake monitoring system 1200. The monitoring system can include several of the sensor assemblies. These sensor assemblies can be disposed at different locations the brake system (e.g., the air brake system). For example, the sensor assemblies can be disposed onboard different vehicles in a multi-vehicle system (e.g., with one sensor assembly onboard each of two or more of the vehicles, multiple sensor assemblies onboard each of two or more of the vehicles, etc.) and/or one or more of the sensor assemblies can be disposed between vehicles. The sensor assemblies can communicate the times at which the pressure decreases of brake applications occur (as described above) to a system controller 1202 of the monitoring system via a communication device 1204 ("Comm. Device" in FIG. 8) of the monitoring system. The system controller can represent hardware circuitry that includes and/or is connected with one or more processors (e.g., one or more microprocessors, integrated circuits, field programmable gate arrays, etc.) that perform the operations described in connection with the system controller.

The system controller can receive the different times at which the pressure drops are detected by the sensor assemblies and optionally can determine whether one or more of the times needs to be adjusted due to clock drift. For example, the system controller may repeatedly poll the clock devices of the sensor assemblies by sending poll signals to the assembly controllers. In response to receiving these poll signals, the assembly controllers can send response signals that include or represent the time of the clock devices of the respective sensor assemblies. The system controller can determine a difference between a time of the master clock device with the times of the clock devices as reported by the assembly controllers in the response signals. The difference between the time of the master clock device and the time reported by each assembly controller can be a time drift of the clock device of that assembly controller. The system controller can then adjust the time reported by the assembly controller by the amount of the drift. For example, if the difference between the master clock and the clock device of a sensor assembly is +45 seconds (e.g., the time of the clock device is forty-five seconds behind the master clock), the system controller can reduce the time reported by the clock device of the sensor assembly by forty-five seconds. This can ensure that the times reported by several sensor assemblies are synchronized to the same time reference (e.g., the time of the master clock).

The system controller can compare the times reported by the sensor assemblies with each other to determine where the pressure drop began. For example, the system controller can determine which sensor assembly detected the pressure drop before all other sensor assemblies. The location of the leak or other issue giving rise to the unintended brake application may be closer to the sensor assembly that reported the earliest pressure drop. As a result, the system controller can determine where the leak is located based on the location of the sensor assembly. The locations of the sensor assemblies may be known to the system controller (e.g., stored in a local or external memory). For example, an identification of the vehicles that the sensor assemblies are located on can be known to the system controller. Once the sensor assembly reporting the earliest pressure drop is identified, the system controller can determine the vehicle on which that sensor assembly is located. This vehicle can be identified by the system controller as the location of the leak in the brake pipe or air brake system.

Once the location of the leak is located, the system controller can implement one or more responsive actions. As one example, a warning signal or message can be communicated or presented. This signal or message can generate an alarm, present a display to an operator, or the like, to notify the operator of the location of the detected leak. As another example, the system controller can send a signal or message to request inspection and/or repair of the air brake system at the identified location of the leak. The system controller can communicate a signal requesting that the vehicle associated with the leak be removed from the vehicle system for inspection and/or repair. As another example, the system controller can change movement of the vehicle system. The system controller can prevent the vehicle system from traveling faster than a designated speed (e.g., which is slower than a speed limit of the route on which the vehicle system is traveling). Optionally, the system controller can stop movement of the vehicle system until the leak is repaired.

Figure 9:
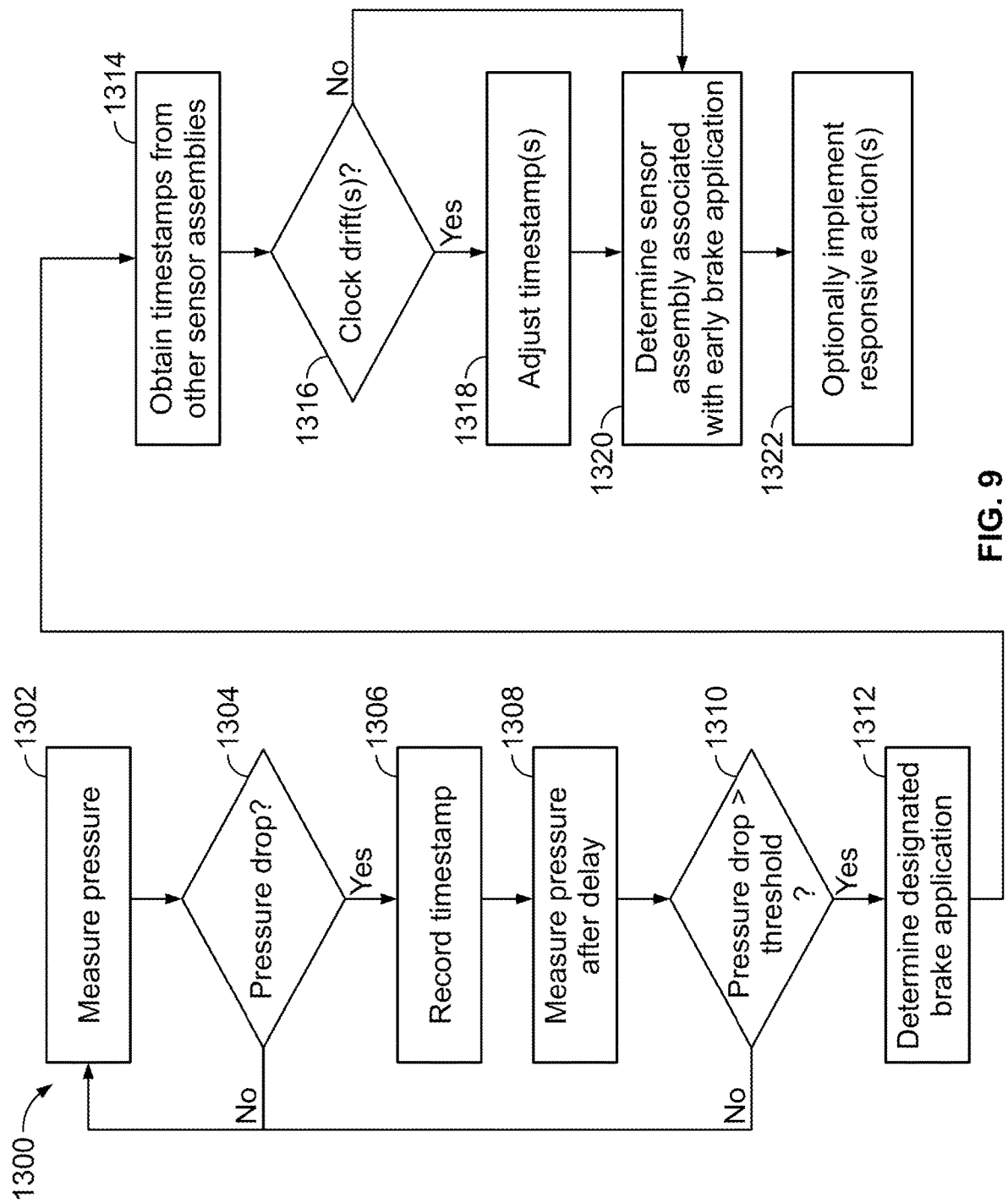
FIG. 9 illustrates a flowchart of one embodiment of a method for monitoring a brake system.
Figure 10:
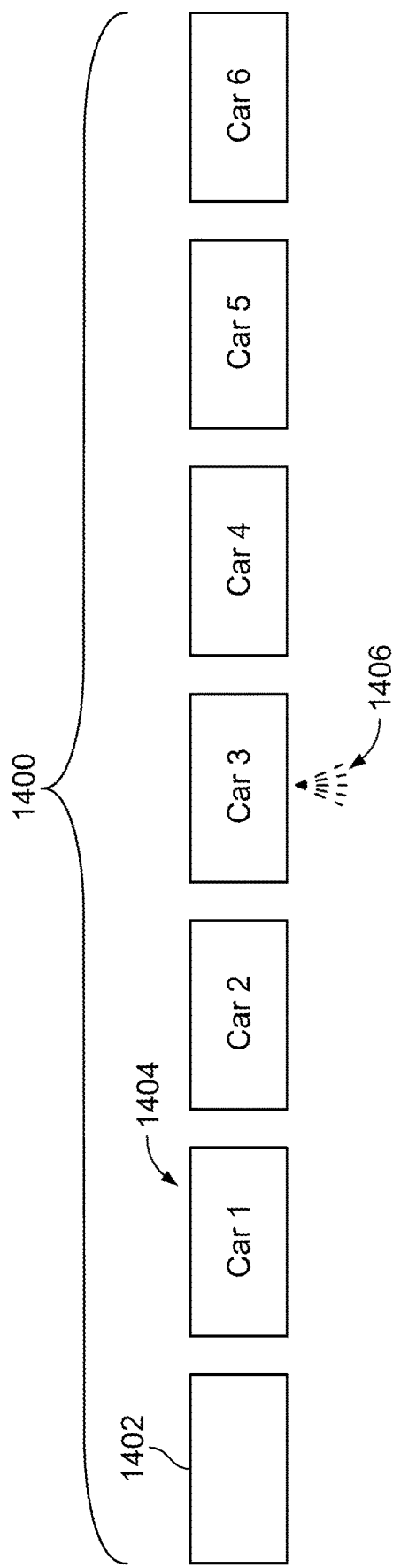
FIG. 10 illustrates operation of a vehicle system in connection with the method shown in FIG. 9.
Figure 11:
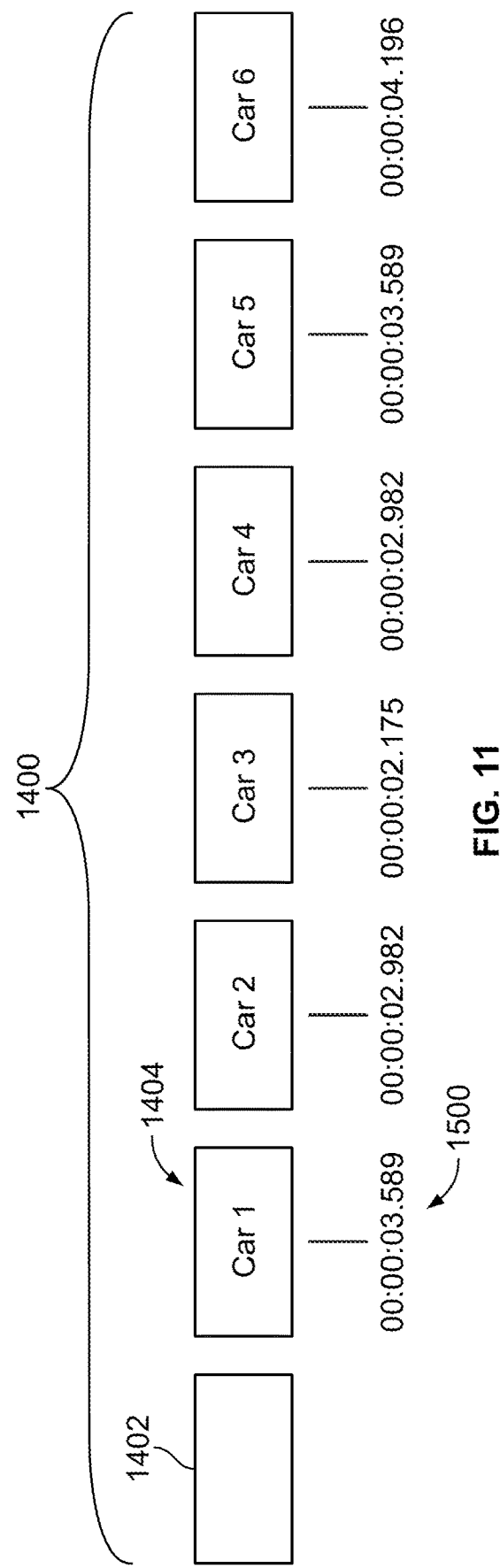
FIG. 11 also illustrates operation of a vehicle system in connection with the method shown in FIG. 9.

FIG. 9 illustrates a flowchart of one embodiment of a method 1300 for monitoring a brake system. The method can represent operations performed by the brake monitoring system described herein. With continued reference to the flowchart of the method shown in FIG. 9, FIGS. 10 and 11 illustrate operation of a vehicle system 1400 in connection with the method. The vehicle system is a multi-vehicle system that includes at least one propulsion-generating vehicle 1402 and one or more non-propulsion-generating vehicles 1404 ("Car 1", "Car 2", etc.). In the illustrated embodiment, the vehicle system is a rail vehicle system formed from a locomotive and six rail cars. Alternatively, the vehicle system may be formed from vehicles other than rail vehicles. For example, the vehicle system may be formed from a truck and one or more trailers using an air brake system and/or hydraulic brake system. The pressures of the air and/or hydraulic fluid can be monitored as described here to identify locations of leaks. The brake system described above can extend along the vehicle system.

The operations described in connection with steps 1302, 1304, 1306, 1308, 1310, 1312 may be performed by each of two or more sensor assemblies that are connected with the same brake system at different locations. The operations described in connection with steps 1314, 1316, 1318, 1320, 1322 may be performed by the system controller. At step 1302 in the method 1300, pressure of the brake system is measured. For example, each of two or more of the sensor assemblies fluidly coupled with the same brake system in different locations may measure pressures of the brake system at the different locations.

At step 1304, a determination is made as to whether the pressure has decreased. For example, the sensor assemblies may repeatedly measure the pressure of the brake system at step 1302 and a determination may be made (e.g., at each of two or more of the sensor assemblies) at step 1304 as to whether the pressure measured by that sensor assembly has decreased. If the measured pressure has decreased, then this decrease may indicate that a brake application, such as an undesired emergency brake application, is beginning. As a result, flow of the method 1300 can proceed toward step 1306. As shown in FIG. 10, the third non-propulsion-generating vehicle (e.g., "Car 3" in FIG. 10) has experienced a leak 1406 in the brake pipe. The decreased pressure of the brake pipe that is determined at step 1304 may indicate this leak 1406.

But, if the measured pressure has not decreased, then the lack of decrease in measured pressure may indicate that a brake application, such as an undesired emergency brake application, has not occurred or has not begun. As a result, flow of the method 1300 can return toward step 1302 for measurement of additional pressures. Alternatively, the method can terminate.

At step 1306, a timestamp is determined. For example, the time at which a decrease in pressure is measured by a sensor assembly may be determined from the clock device of the sensor assembly. At step 1308, the pressure of the brake system is measured again by the sensor assembly. The same sensor assembly that measured the pressure decrease at steps 1302, 1304 and that determined the time of the pressure decrease at step 1306 may measure the pressure of the brake system again at step 1308. This second or subsequent pressure measurement can be performed at the same location but after a designated time delay from detection of the pressure drop at step 1304. For example, after determining that the measured pressure decreased at step 1304, the sensor assembly onboard the vehicle "Car 3" in FIG. 10 can wait for two seconds or another period of time before measuring the pressure of the same brake system again.

At step 1310, a determination as to whether the pressure measurements indicate that the pressure decreased below a designated threshold. For example, the sensor assembly can determine whether the pressure measured at step 1308 at the vehicle "Car 3" is less than a threshold of twenty psi, less than a threshold of ten psi, or another limit. Optionally, the determination may be made as to whether the decrease in pressure from the measurement obtained at step 1302 and the measurement obtained at step 1308 at the vehicle "Car 3" is greater than a designated decrease. For example, the sensor assembly can determine whether the pressures measured at step 1302 and step 1308 indicate that the pressure in the brake system at the vehicle "Car 3" dropped by at least forty psi, at least fifty psi, or the like.

If the pressure drops to below the threshold (or the pressure drop is greater than the threshold), then the pressure or pressure drop can indicate a brake application. This additional check on the pressure drop can serve as confirmation that the decrease in pressure identified at step 1304 is a brake application and not a temporary fluctuation of pressure (that is not caused or part of a brake application). But, if the emergency brake application was not manually or automatically implemented by an operator or computerized control system of the vehicle system, then the brake application may not be an intended application. Consequently, flow of the method can proceed toward step 1312. But, if the pressure does not drop below the threshold or the pressure drop is not greater than the threshold, then the pressure or pressure drop may not indicate a brake application. As a result, flow of the method can return toward step 1302 for measurement of additional pressures. Alternatively, the method can terminate. At step 1312, a designated brake application is determined to have occurred. For example, the assembly controller can determine that the decreased pressure or the drop in pressure indicates that an emergency brake application has occurred.

As described above, the operations of steps 1302, 1304, 1306, 1308, 1310, and 1312 may be performed by each of two or more sensor assemblies coupled with the same brake system. The operations of steps 1314, 1316, 1318, 1320, 1322 may be performed by the system controller. At step 1314, timestamps are obtained from sensor assemblies that identified a designated brake application. For example, the times at which different sensor assemblies coupled with the same brake system detected the pressure decrease (e.g., at step 1304) at or near the beginning of the brake application can be obtained (e.g., received) by the system controller. As shown in FIG. 11, several timestamps 1500 from sensor assemblies disposed onboard the different non-propulsion-generating vehicles may be sent to the system controller.

At step 1316, a determination may be made as to whether the timestamps received by any of the sensor assemblies include clock drifts. As described above, the clock device of one or more of the sensor assemblies may drift away from the time managed by the master clock device of the system controller. The system controller can determine whether any clock drifts are present by examining the times provided by the sensor assemblies in the response signals received in response to the poll messages. If the timestamp provided by one or more of the sensor assemblies is subject to clock drift, then one or more of the timestamps may need to be adjusted to ensure that the timestamps from the sensor assemblies can be accurately compared with each other. As a result, flow of the method 1300 can proceed toward step 1318. But, if the timestamps provided by the sensor assemblies are not subject to clock drift (e.g., the clock devices of the sensor assemblies are all synchronized to the master clock or the same time reference), then the timestamps may not need to be adjusted. As a result, flow of the method 1300 can proceed toward 1320.

At step 1318, the timestamp(s) that include clock drift are modified. The system controller can determine the amount of clock drift for a timestamp of a sensor assembly based on the response signal received from the sensor assembly, as described above. The amount of the clock drift can be used to adjust the timestamp from the sensor assembly. This can be repeated for the timestamps sent from sensor assemblies demonstrating clock drift to ensure that the timestamps are all on the same time reference.

At step 1320, the sensor assembly associated with the location of the early brake application is identified. For example, the system controller can compare the timestamps reported by the sensor assemblies to determine which of these timestamps occurred first or earliest. With respect to the example shown in FIG. 11, the timestamp provided by "Car 3" is earliest. This indicates that the drop in pressure was first detected by the sensor assembly onboard "Car 3." The system controller can determine that the leak is located onboard "Car 3," such as in the segment of the brake pipe in "Car 3," in a connector or valve of the brake pipe onboard "Car 3," or the like.

At step 1322, one or more responsive actions may be implemented. As one example, the system controller can send a signal to an off-board repair facility to identify the location of the leak as well as request or schedule inspection and/or repair of the leak at the identified location. As another example, the system controller can send a signal to an output device (e.g., an electronic display, a speaker, or the like) to generate a warning onboard the vehicle system and/or identify the location of the leak. As another example, the system controller can restrict movement of the vehicle system (or can communicate a signal to a controller of the vehicle system), such as by reducing an upper speed at which the vehicle system can move, by stopping movement of the vehicle system, by directing one or more other brake systems to actuate, or the like. Operation of the method can then terminate or can return to step 1302 to repeat one or more times.

Figure 12:
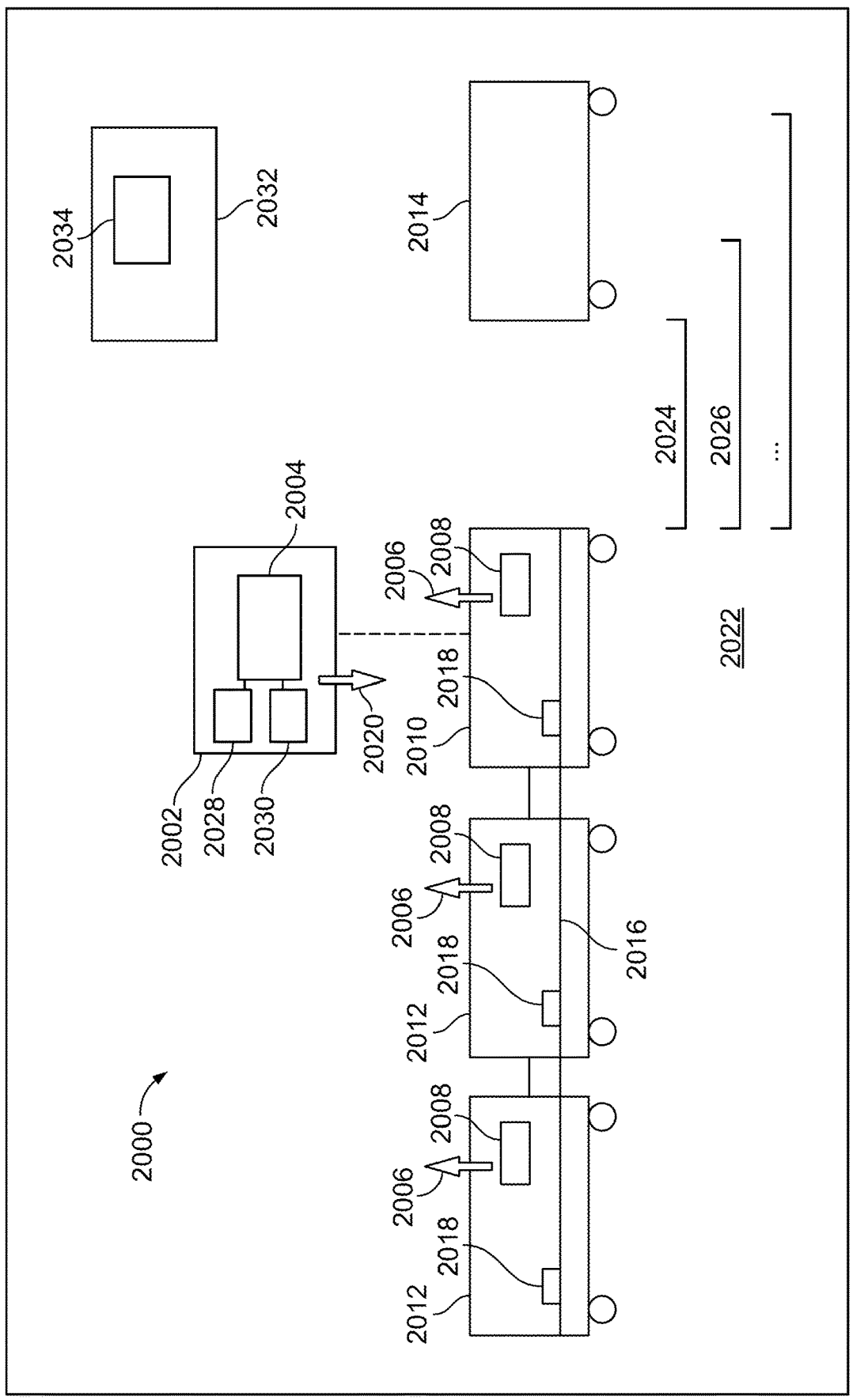
FIG. 12 is a schematic diagram of an embodiment of a vehicle control system.

Turning now to FIG. 12, an embodiment of a vehicle control system 2000 includes a controller 2002 having at least one processor 2004 that may receive signals 2006 from plural sensors 2008 respectively on board a first vehicle 2010 and plural other, second vehicles 2012. The processor can represent a single processor that performs all operations of the controller or multiple processors, with each processor performing all of the operations of the controller or different processors performing different operations of the controller. The processor can represent one or more integrated circuits, microprocessors, microcontrollers, field programmable gate arrays, etc. The controller may determine a brake assessment of a brake system 2016 based on the signals received from the plural sensors. The brake assessment includes a state of health of the brake system and/or a location of interest of a leak in the brake system (e.g., as may be determined as per any of the embodiments described herein, with reference to FIGS. 1-11 or otherwise). The controller may control movement of the first vehicle and the second vehicles relative to at least one remote vehicle system 2014 based at least in part on the determined brake assessment.

In an embodiment, the brake system 2016 includes plural vehicle brake units 2018 respectively on board the first vehicle and the second vehicles. The brake units may respectively brake the first vehicle and the second vehicles responsive to received braking control signals 2020. For example, each brake unit can represent a friction brake, brake cylinder, brake piston, etc., onboard a vehicle and part of an air brake system of the vehicle system. Optionally, one or more of the brake units can represent a traction motor that can dynamically brake the vehicle system. The brake assessment includes respective plural states of health of the plural vehicle brake units. That is, the controller may (for each vehicle) determine a respective state of health of the vehicle brake unit on board that vehicle based on the signals received from that vehicle. The controller may control the movement of the first vehicle and the second vehicles (e.g., in concert as a vehicle consist) based on the plural states of health.

In another embodiment, the controller may switch between controlling movement of the vehicle system in plural different modes of operation based on comparisons of the plural states of health to designated criteria. Here, for example, the controller may control the vehicles in a first mode of operation if the plural states of health meet first criteria, to control the vehicles in a different, second mode of operation if the plural states of health meet second criteria (and/or fail to meet the first criteria), to control the vehicles in a different, third mode of operation if the plural states of health meet third criteria (and/or fail to meet the first or second criteria), and so on. The controller can switch between two or more different modes of operation during movement of the vehicle system from one location to another location. Examples of controlling the vehicle system according to the different modes may include maintaining at least different minimum trailing distances (between the first/second vehicles and a leading separate vehicle system), different maximum or minimum speed limits, different braking control curves (e.g., more aggressive versus less aggressive), etc., each associated with a different mode of operation. A braking control curve may be a relationship or predesignated plan of different brake settings or speeds associated with different locations, times, and/or distances (e.g., for bringing the vehicles to a designated speed or stopped within a designated distance).

For example, in one embodiment, the plural different modes of operation comprise plural different designated minimum trailing distances 2022 between the first and second vehicles and the remote vehicle system. Stated differently, the different trailing distances are different minimum distances between the vehicle system and another, separate vehicle system. These minimum distances can be set to reduce or eliminate the likelihood of collision between the vehicle systems. The controller may control the first and second vehicles to travel no closer to the remote vehicle system than a first 2024 of the designated minimum trailing distances responsive to the states of health being indicative of a relatively greater degree of health of the first and second vehicles and to control the first and second vehicles to travel no closer to the remote vehicle system than a second 2026 of the designated minimum trailing distances responsive to the states of health being indicative of a relatively lesser degree of health of the first and second vehicles. The second designated minimum trailing distance is greater than the first designated minimum trailing distance. (There may be additional designated minimum trailing distances for intermediate or other health assessments.) This reflects that it may be desirable to maintain a larger minimum distance between the first/second vehicles and a preceding, remote vehicle (e.g., on the same route) if the brake system of the first/second vehicles is determined to be relatively less healthy and to allow a closer minimum distance if the brake system is determined to be relatively more healthy.

In another embodiment, the controller may determine a composite state of health of the first and second vehicles based on comparisons of the plural states of health to designated criteria and individual vehicle weighting factors of vehicle type and/or vehicle location The controller also may switch between controlling the movement in plural different modes of operation based on the composite state of health. For example, the states of health of non-propulsion-generating vehicles (e.g., freight cars, trailers, etc.) may be weighted lower than the states of health of propulsion-generating vehicles (e.g., locomotives, trucks, etc.) since propulsion-generating vehicles may be able to provide a greater degree of braking if needed (e.g., through both dynamic braking and air brakes). Here, if a freight car is determined to be of relatively low health, that has less of an impact on selecting a particular mode of operation than if a locomotive is determined to be of relatively low health. Another example is the location of a vehicle car in a multi-vehicle system (e.g., a car at the head or leading end might be treated different, in regard to selecting a mode of operation, versus a car in the middle versus a car at the end), or the location of a car relative to terrain, e.g., a car traveling uphill might be treated differently than a car traveling downhill such that a car with a determined relatively low brake system health might have less of an impact (on selecting a mode of operation) when traveling uphill than when traveling downhill.

For example, the controller may select between different designated modes of operation based on the location of the leak relative to the overall vehicle system, such that a particular mode of operation is selected, or a health assessment is weighted up or down, if the leak is in a rear car, or in a middle car, or towards the front. As another example, the controller may (alternatively or additionally) select between the different modes of operation, and/or to weight a health assessment up or down, based at least in part on the type of leak, and/or a severity or degree of the leak.

In another embodiment, the controller further includes a communication interface circuit 2028 and a power circuit 2030 both electrically connected to the at least one processor. The power circuit may receive electrical power from a power source on board a first vehicle for the controller to be deployed on board the first vehicle. The communication interface circuit may receive the signals from the first vehicle and the second vehicles over at least one of one or more wired connections or one or more wireless connections. For example, the communication interface circuit may receive the signals from the first vehicle over the one or more wired connections and from the second vehicles over a first wireless connection of the one or more wireless connections. The communication interface circuit may wirelessly communicate with a remote location 2032 off board the first and second vehicles over a cellular (e.g., public mobile phone network) communication link.

In another embodiment, the controller may control a vehicle system (first and second vehicles) responsive to receipt of one or more positive vehicle control (PVC) signals received from a PVC system 2034 located off board the first and second vehicles. A positive vehicle control (PVC) system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is in contrast with 'negative' vehicle control systems where a vehicle is allowed to move unless a signal (restricting movement) is received.

In one aspect, the controller may control the movement of the vehicle system (first and second vehicles) based on a control designation of the PVC signals as modified by the determined brake assessment according to designated PVC control modification criteria. That is, the PVC system may include a designated control scheme paradigm wherein a vehicle system is controlled a first designated manner if first criteria are met and is controlled in a different second designated manner if second criteria are met and/or the first criteria are not met. In embodiments, and based on a brake assessment, the controller may, (i) upon receipt of PVC signals indicating the first designated manner, instead control the vehicle system in a first modified or other manner, or (ii) upon receipt of PVC signals indicating the second designated manner, instead control the vehicle system in a different, second modified manner or other manner, etc. One example is a PVC system that sends signals to a vehicle system (or stops the transmission of signals) if the vehicle system comes within a designated threshold distance of another vehicle, where the controller may increase or decrease the threshold distance based on a brake assessment.

The brake assessments can be performed repeatedly by the controller during operation of the vehicle(s). For example, the controller can re-determine assessments of the states of health of the brake units multiple times during movement of the vehicles during a trip from one location to another. Optionally, the controller can determine (or re-determine) the assessment of one or more (or all) brake units on demand from an operator. The operator can provide input to the controller (e.g., by activating a button, lever, switch, etc.; by touching a screen; by providing an audible command; or the like). Responsive to receiving this input, the controller can ascertain the states of health of the brake units. In this way, the operator can remotely control when the controller assesses the states of health of the brake units. Optionally, the assessments of states of health of the brake units can be remotely initiated or commenced by the controller responsive to receiving a command signal from an off-board source, such as a remote control unit used by an operator off-board the vehicle(s), the PVC system, or the like.

Figure 13:
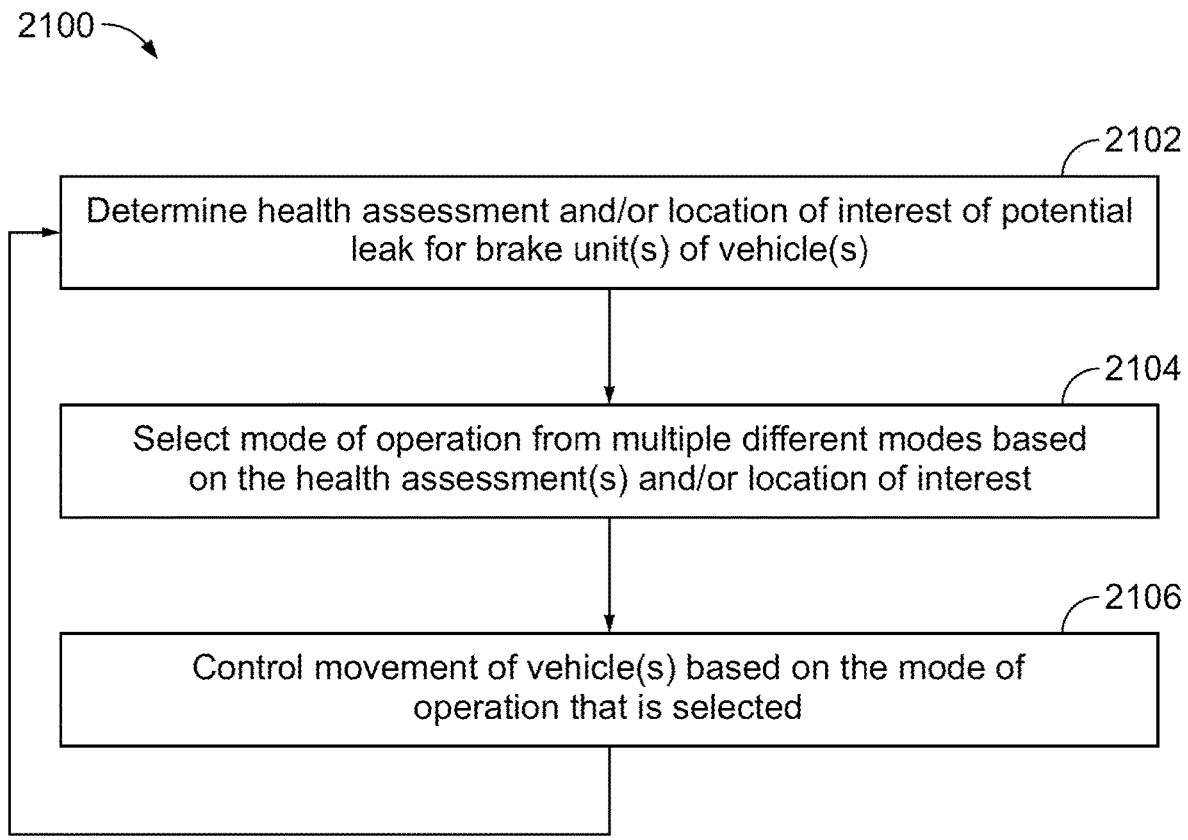
FIG. 13 illustrates a flowchart of one example of a method for controlling movement of one or more vehicles based on health assessment(s) of brake unit(s) of the vehicle(s).

FIG. 13 illustrates a flowchart of one example of a method 2100 for controlling movement of one or more vehicles based on health assessment(s) of brake unit(s) of the vehicle(s). The method can represent operations performed by the controller of the vehicle control system described herein. At step 2102, one or more health assessments of the brake unit(s) in a brake system and/or a location of interest of a potential leak in the brake system are determined. The health assessments may be determined by measuring pressures in different components of the brake system, selecting a health monitoring mode based on the measured pressures, and determining the states of health of the brake units and/or brake system by comparing one or more of the measured pressures with one or more allowable brake pressures associated with the health monitoring mode that is selected, as described above. The location of interest of the potential leak can be determined by detecting decreases in pressure in different locations in the brake system, determining times at which the pressure decreases occurred, and comparing the times with each other, as described above.

At step 2104, a mode of operation of the vehicle system is selected from multiple, different modes of operation based on the health assessment(s) and/or location of interest of the potential leak. The modes of operation can be associated with different trailing or separation distances, different speed limits, and/or brake control curves, as described above. At step 2106, movement of the vehicle system is controlled according to the mode of operation. For example, the controller can prevent the vehicle system from moving closer to another vehicle or vehicle system than the separation distance associated with the selected mode of operation, from moving faster than the speed limit associated with the selected mode of operation, and/or from decelerating faster or slower than the brake control curve associated with the selected mode of operation. Flow of the method can then return toward step 2102 or may terminate.

In embodiments, a controller may control movement of a vehicle system (e.g., first and second vehicles) relative to a remote vehicle system based on a brake assessment. Alternatively or additionally, a controller may control other aspects of movement based on the brake assessment, e.g., movement of the vehicle relative to a speed limit and irrespective of the movement of remote vehicles, or in addition to taking into account the movement, locations, etc. of other vehicles.

In embodiments, a control system may determine respective brake assessments for each of plural vehicles in a vehicle system, as described herein (e.g., determine respective states of health, and/or locations of interests of brake system leaks), and to quantify or classify the brake assessments, on a per vehicle basis, into a designated classification scheme or format. For example, brake assessments may be categorized, again as per designated criteria, into "good," "fair," or "poor" categories (e.g., as may be color classified as green, yellow, or red, respectively, or as per some other designated color format or scheme). Movement control (of the vehicle system) is then based on how the vehicles are categorized, such that responsive to "all good" (e.g., all green) the vehicle system is controlled (e.g., relatively to a remote vehicle system) in a least conservative designated manner, and responsive to "majority good but some fair" (e.g., mixed green and yellow) the vehicle system is controlled in a more conservative designated manner, and responsive to "some good but some fair and poor" (or "at least one poor") (e.g., green, yellow, and red) the vehicle system is controlled in an even more conservative designated manner, and so on. In this context, controlling in a more conservative manner might include reducing an upper speed limit at which the vehicle system is restricted to travel no faster than or increasing the minimum distance between the vehicle system and other vehicle systems, whereas a less conservative manner might include a faster speed limit or shorter minimum distance.

In another embodiment, a vehicle control system includes a controller having at least one processor. The controller may receive first signals from plural sensors respectively on board a vehicle system having a first vehicle and plural other, second vehicles, and also may receive second signals from a remote PVC system. The controller may, based on the first signals received from the plural sensors, determine a brake assessment of a brake system. The brake assessment includes a state of health of the brake system and/or a location of interest of a leak in the brake system. The controller also may control movement of the vehicle system based at least in part on the brake assessment in combination with the second signals received from the PVC system. That is, in at least one mode of operation, at any given time or during a time interval of the at least one mode of operation, vehicle movement is controlled based on both the brake assessment and the PVC signals.

While one or more embodiments of the inventive subject matter described herein relate to rail vehicles and air brake systems, not all embodiments are limited to rail vehicles and/or air brake systems. One or more embodiments may be used in connection with other vehicle types, such as trucks pulling trailers with air brakes; automobiles or other vehicles having hydraulic brakes (where the hydraulic fluid pressure is measured instead of air pressure to locate the leak inside the vehicle); or the like.

In one embodiment, a method is provided that includes measuring pressures in different components of a brake system of a vehicle system during movement of the vehicle system, comparing two or more of the pressures that are measured in the different components with each other to select a health monitoring mode, selecting one or more allowable pressures based on the health monitoring mode that is selected, and determining a state of health of the brake system by comparing one or more of the pressures that is measured with the one or more allowable pressures that are selected.

The pressures may be measured in two or more of a brake cylinder, an auxiliary reservoir, an emergency reservoir, or a brake pipe of the vehicle system. The vehicle system may include one or more of a rail vehicle, an automobile, or a truck. The brake system may be an air brake system. Or, the brake system may be a hydraulic brake system.

The pressures may be measured in each of a brake cylinder, an auxiliary reservoir, an emergency reservoir, and a brake pipe of the vehicle system. The health monitoring mode may be selected from among several different health monitoring modes based on a difference between the pressures measured in at least two of the different components. The pressures may be measured in an emergency reservoir, in a brake pipe, and in a brake cylinder of the vehicle system, and the state of health is determined based on the pressure measured in the brake cylinder and based on a difference between the pressure measured in the emergency reservoir and the pressure measured in the brake pipe. The state of health that is determined based on the pressure measured in the brake cylinder and based on the difference between the pressure measured in the emergency reservoir and the pressure measured in the brake pipe may be one or more of a brake that is in a stuck position or a retainer valve that is stuck in a high pressure state.

The state of health that is determined based on the pressure measured in the brake cylinder and based on the difference between the pressure measured in the emergency reservoir and the pressure measured in the brake pipe may be a brake that is unintentionally released. The state of health may be determined by selecting a range of allowable pressures from among several different ranges of allowable pressures associated with different values of the difference between the pressure measured in the emergency reservoir and the pressure measured in the brake pipe, and by determining whether the pressure measured in the brake cylinder is within the range of allowable pressures. The pressures may be measured in an emergency reservoir, in a brake pipe, and in an auxiliary reservoir of the vehicle system. The state of health may be determined by selecting a set of different ranges of allowable pressures from among several different sets of different ranges of allowable pressures based on a comparison between the pressure measured in the emergency reservoir and the pressure measured in the auxiliary reservoir and selecting a range of allowable pressures from among the different ranges of allowable pressures in the set that is selected. The different ranges can be associated with different values of the pressure measured in the brake pipe. The state of health also can be determined by determining whether the pressure measured in the brake cylinder is within the range of allowable pressures that is selected.

In one embodiment, a system is provided that includes pressure sensors that may measure pressures in different components of a brake system of a vehicle system during activation of the brake system and a controller that may compare two or more of the pressures that are measured in the different components with each other to select a health monitoring mode. The controller may select one or more allowable pressures based on the health monitoring mode that is selected and may determine a state of health of the brake system by comparing one or more of the pressures that is measured with the one or more allowable pressures that are selected.

The pressure sensors may include two or more of a brake cylinder pressure sensor, an auxiliary reservoir pressure sensor, an emergency reservoir pressure sensor, or a brake pipe pressure sensor. The pressure sensors may include a brake cylinder pressure sensor, an auxiliary reservoir pressure sensor, an emergency reservoir pressure sensor, and a brake pipe pressure sensor. The controller may select the health monitoring mode from among several different health monitoring modes based on a difference between the pressures measured in at least two of the different components. The pressure sensors may include an emergency reservoir pressure sensor, a brake pipe pressure sensor, and a brake cylinder pressure sensor, and the controller may determine the state of health based on the pressure measured by the brake cylinder pressure sensor and based on a difference between the pressure measured by the emergency reservoir pressure sensor and the pressure measured by the brake pipe pressure sensor.

The controller may determine the state of health as one or more of a brake that is in a stuck position or a retainer valve that is stuck in a high pressure state based on the pressure measured by the brake cylinder pressure sensor and based on the difference between the pressure measured by the emergency reservoir pressure sensor and the pressure measured by the brake pipe pressure sensor. The controller may determine the state of health as a brake that is unintentionally released based on the pressure measured by the brake cylinder pressure sensor and based on the difference between the pressure measured by the emergency reservoir pressure sensor and the pressure measured by the brake pipe pressure sensor.

The controller may determine the state of health by selecting a range of allowable pressures from among several different ranges of allowable pressures associated with different values of the difference between the pressure measured in the emergency reservoir and the pressure measured in the brake pipe, and by determining whether the pressure measured in the brake cylinder is within the range of allowable pressures. The pressure sensors may include an emergency reservoir pressure sensor, a brake pipe pressure sensor, and an auxiliary reservoir pressure sensor.

The controller may determine the state of health by selecting a set of different ranges of allowable pressures from among several different sets of different ranges of allowable pressures, the set selected by the controller based on a comparison between the pressure measured in the emergency reservoir and the pressure measured in the auxiliary reservoir, selecting a range of allowable pressures from among the different ranges of allowable pressures in the set that is selected, the different ranges associated with different values of the pressure measured in the brake pipe, and determining whether the pressure measured in the brake cylinder is within the range of allowable pressures that is selected.

The pressure sensors may measure two or more of the pressures are measured in the same component at different times, and the controller may determine the state of health as a leak based on the two or more pressures that are measured.

In one embodiment, a method is provided that includes measuring pressures in different components of a brake system of a vehicle system, comparing two or more of the pressures that are measured in the different components with each other to select a health monitoring mode, and determining a state of health of the brake system by comparing one or more of the pressures that is measured with the one or more allowable pressures that are selected.

The pressures may be measured in two or more of a brake cylinder, an auxiliary reservoir, an emergency reservoir, or a brake pipe of the vehicle system. The health monitoring mode may be selected from among several different health monitoring modes based on a difference between the pressures measured in at least two of the different components.

In any of the systems or methods described herein, the determined state of health can be used as a basis for one or more of controlling movement of the vehicle system, controlling an onboard device of the vehicle system, scheduling a maintenance operation of the vehicle, scheduling movement of the vehicle system, controlling a display to display the state of health, etc.

In one embodiment, the control system or controller may have a local data collection system deployed that may use machine learning to enable derivation-based learning outcomes. The control system or controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system or controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies or techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one embodiment, a method (e.g., for monitoring a brake system) is provided that includes monitoring pressures in a brake system of a vehicle system at different locations in the vehicle system, determining decreases in the pressures that are monitored at two or more of the different locations, determining times at which the decreases in the pressures occurred, and determining a location of interest of a leak in the brake system by comparing the times at which the decreases in the pressures occurred.

The pressures that are monitored may be air pressures. The brake system may be an air brake system that extends through and fluidly couples multiple vehicles of the vehicle system. The pressures may be monitored onboard each of two or more vehicles in the vehicle system. The times of the decreases in pressure may be determined by measuring a first decrease of the decreases in the pressures at a first location of the locations, determining a first timestamp associated with measurement of the first decrease, and confirming that the first decrease indicates a brake application by measuring the pressure at the first location after a time delay from measurement of the first decrease.

The method also can include modifying one or more of the times at which the decreases in the pressures occurred based on one or more clock drifts of one or more clock devices located at one or more of the locations where the pressures are measured. The location of interest of the leak in the brake system may be determined by identifying an earliest time of the times at which the decreases in pressure occurred and determining the location associated with the decrease in the pressure associated with the earliest time.

In one embodiment, a system (e.g., a brake monitoring system) is provided that includes plural sensor assemblies that may monitor pressures in a brake system of a vehicle system at different locations in the vehicle system. Two or more of the sensor assemblies at the different locations may determine decreases in the pressures that are monitored and determine times at which the decreases in the pressures occurred. The system also includes a system controller that may determine a location of interest of a leak in the brake system by comparing the times at which the decreases in the pressures occurred.

The sensor assemblies may monitor air pressures of the brake system as the pressures. The brake system may be an air brake system that extends through and fluidly couples multiple vehicles of the vehicle system. The sensor assemblies may be disposed onboard each of two or more vehicles in the vehicle system. The sensor assemblies may determine the times of the decreases in pressure by measuring a first decrease of the decreases in the pressures at a first location of the locations, determining a first timestamp associated with measurement of the first decrease, and confirming that the first decrease indicates a brake application by measuring the pressure at the first location after a time delay from measurement of the first decrease.

The system controller may modify one or more of the times at which the decreases in the pressures occurred based on one or more clock drifts of one or more clock devices located at one or more of the locations where the pressures are measured. The system controller may determine the location of interest of the leak in the brake system by identifying an earliest time of the times at which the decreases in pressure occurred and determining the location associated with the decrease in the pressure associated with the earliest time.

In one embodiment, a system (e.g., a brake monitoring system) is provided that includes plural sensor assemblies that may be disposed onboard different non-propulsion-generating vehicles of a multi-vehicle system. The sensor assemblies include pressure sensors that may measure air pressures in an air brake system of the vehicle system. The sensor assemblies include clock devices and assembly controllers that may determine decreases in the pressures that are monitored and to determine times at which the decreases in the pressures occurred from the clock devices. The system also includes a system controller that may receive the times from the sensor assemblies and to determine a location of interest of a leak in the brake system by comparing the times at which the decreases in the pressures occurred.

The multi-vehicle system may be a rail vehicle system. The system controller may modify one or more of the times from one or more of the sensor assemblies due to clock drift of one or more of the clock devices. The system controller may determine the location of interest of the leak in the brake system by identifying an earliest time of the times from the sensor assemblies. The system controller may determine the location of interest as the location associated with the sensor assembly that provided the earliest time to the system controller. The sensor assemblies may confirm the decreases in the pressures by repeating measurement of the pressures following determining the times at which the decreases in the pressures are determined.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one embodiment, the controller may determine, based at least in part on the signals received from the plural sensors, a brake assessment of a brake system. And, the controller may control movement respective propulsion systems of one or both of the first vehicle and the second vehicles relative to at least one remote vehicle system based at least in part on the brake assessment that is determined. For example, rather than only control the braking system the controller may control the amount of propulsive power generated by the propulsion system so as to not propel any of the vehicles faster than the braking system (at its state of health) may be able to stop such vehicle in a determined manner. The manner being one or more of a stopping time, a stopping distance, a stopping force, and a deceleration and/or stopping rate.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a controller comprising at least one processor configured to receive signals from plural sensors respectively on board a first vehicle and plural other, second vehicles; and
   the controller is configured, based at least in part on the signals received from the plural sensors, to determine a brake assessment of a brake system, the brake assessment comprising one or more of states of health of components of the brake system or a location of interest of a leak in the brake system, and the controller is configured to control movement of the first vehicle and the second vehicles relative to at least one remote vehicle system based at least in part on the brake assessment that is determined.

2. The system of claim 1, wherein the brake system includes plural vehicle brake units on board the first vehicle and the second vehicles and the brake assessment comprises the states of health of the vehicle brake units, and
   the controller is configured to control the movement of the first vehicle and the second vehicles based on the states of health.

3. The system of claim 2, wherein the controller is configured to switch between controlling the movement in plural different modes of operation based on comparisons of the states of health to designated criteria.

4. The system of claim 3, wherein the different modes of operation comprise different designated minimum trailing distances between (a) the first vehicle and the second vehicles and (b) the remote vehicle system, and wherein the controller is configured to control the first and second vehicles to travel no closer to the remote vehicle system than a first of the designated minimum trailing distances responsive to the states of health being indicative of a greater degree of health of the first and second vehicles and to control the first and second vehicles to travel no closer to the remote vehicle system than a different, second of the designated minimum trailing distances responsive to the states of health being indicative of a lesser degree of health of the first and second vehicles.

5. The system of claim 2, wherein the controller is configured to determine a composite state of health of the first and second vehicles based on comparisons of the states of health to designated criteria and individual vehicle weighting factors of vehicle type and vehicle location, and wherein the controller is configured to switch between controlling the movement in the different modes of operation based on the composite state of health.

6. The system of claim 5, wherein the different modes of operation comprise plural different designated minimum trailing distances between the first vehicle and second vehicles and the remote vehicle system, and wherein the controller is configured to control the first and second vehicles to travel no closer to the remote vehicle system than a first of the designated minimum trailing distances responsive to the composite state of health being indicative of a relatively greater degree of health and to control the first and second vehicles to travel no closer to the remote vehicle system than a second of the designated minimum trailing distances responsive to the composite state of health being indicative of a relatively lesser degree of health, the second designated minimum trailing distance being greater than the first designated minimum trailing distance.

7. The system of claim 1, wherein the brake system includes plural vehicle brake units on board the first vehicle and the second vehicles, the brake units configured to respectively brake the first vehicle and the second vehicles responsive to received braking control signals, and the brake assessment comprises both the location of interest of the leak in the brake system that is determined and respective plural states of health of the plural vehicle brake units, and
wherein the controller is configured to control the movement of the first vehicle and the second vehicles based on the plural states of health and the location of interest of the leak in the brake system that is determined.

8. The system of claim 7, wherein the controller is configured to switch between controlling the movement in different modes of operation based on the states of health and the location of interest of the leak in the brake system that is determined relative to designated criteria.

9. The system of claim 8, wherein the different modes of operation comprise different designated minimum trailing distances between (a) the first vehicle and the second vehicles and (b) the remote vehicle system, and wherein the controller is configured control the first and second vehicles to travel no closer to the remote vehicle system than a first of the designated minimum trailing distances responsive to the states of health being indicative of a greater degree of health of the first and second vehicles and the location of interest of the leak in the brake system that is determined meeting one or more of the designated criteria, the controller configured to control the first and second vehicles to travel no closer to the remote vehicle system than a second of the designated minimum trailing distances responsive to the states of health being indicative of a lesser degree of health of the first and second vehicles and the location of interest of the leak in the brake system that is determined failing to meet the one or more of the designated criteria, the second designated minimum trailing distance being greater than the first designated minimum trailing distance.

10. The system of claim 1, wherein the controller is further configured to control the first and second vehicles responsive to receipt of one or more positive vehicle control (PVC) signals received from a PVC system located off board the first and second vehicles, the controller configured to control the movement of the first vehicle and the second vehicles based on a control designation of the PVC signals as modified by the brake assessment that is determined according to designated PVC control modification criteria.

11. A system comprising:
a controller configured to receive measured pressures in different components of a brake system of a vehicle system, the controller configured to compare two or more of the pressures that are measured with each other to select a health monitoring mode, the controller also configured to select one or more allowable pressures based on the health monitoring mode that is selected and to determine a state of health of the brake system by comparing one or more of the pressures that is measured with the one or more allowable pressures that are selected.

12. The system of claim 11, wherein the controller is further configured to control movement of the vehicle system relative to at least one remote vehicle system based at least in part on the state of health that is determined.

13. The system of claim 11, wherein the vehicle system includes plural vehicles coupled together, and the controller is configured to receive the pressures that are measured from pressure sensors disposed on board the plural vehicles.

14. The system of claim 11, wherein the controller is further configured to control the vehicle system responsive to receipt of one or more positive vehicle control (PVC) signals received from a PVC system located off board the vehicle system.

15. The system of claim 14, wherein the controller is configured to control movement of the vehicle system based on a control designation of the PVC signals as modified by the state of health that is determined according to designated PVC control modification criteria.

16. A system comprising:
a controller configured to receive pressures measured by sensors at different locations in a vehicle brake system, the controller configured to determine times at which decreases in the pressures occur, to compare the times at which the decreases in the pressures occur with each other, and to determine a location of interest of a leak in the brake system based on comparing the times at which the decreases in the pressures occur.

17. The system of claim 16, wherein the controller is further configured to control movement of the vehicle system relative to at least one remote vehicle system based at least in part on the location of interest of the leak in the brake system that is determined.

18. The system of claim 16, wherein the controller is configured to determine times at which the decreases in the pressures occur by determining a first decrease of the decreases in the pressures at a first location in the vehicle brake system, determining a first timestamp associated with measurement of the first decrease, and confirming that the first decrease indicates a brake application by determining the pressure at the first location after a time delay from measurement of the first decrease.

19. The system of claim 16, wherein the controller is configured to modify one or more times at which the decreases in the pressures occur based on one or more clock drifts of one or more clock devices.

20. The system of claim 16, wherein the controller is configured to determine the location of interest of the leak in the brake system by identifying an earliest time at which the decreases in the pressure occur and determining the location associated with the decrease in the pressure associated with the earliest time.

\* \* \* \* \*